(12) United States Patent
Yu et al.

(10) Patent No.: US 7,366,194 B2
(45) Date of Patent: *Apr. 29, 2008

(54) FIBRE CHANNEL ZONING BY LOGICAL UNIT NUMBER IN HARDWARE

(75) Inventors: Shunjia Yu, San Jose, CA (US); David C. Banks, Pleasonton, CA (US); Ding-Long Wu, San Jose, CA (US); Jieming Zhu, Saratoga, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 10/124,499

(22) Filed: Apr. 17, 2002

(65) Prior Publication Data

US 2002/0176434 A1 Nov. 28, 2002

Related U.S. Application Data

(63) Continuation-in-part of application No. 09/972,471, filed on Oct. 6, 2001.

(60) Provisional application No. 60/327,676, filed on Oct. 6, 2001, provisional application No. 60/290,267, filed on May 10, 2001, provisional application No. 60/284,759, filed on Apr. 18, 2001.

(51) Int. Cl.
*H04L 12/54* (2006.01)
(52) U.S. Cl. ............... 370/429; 370/412; 370/389
(58) Field of Classification Search ............... None
See application file for complete search history.

(56) References Cited

U.S. PATENT DOCUMENTS 4,715,030 A 12/1987 Koch
4,845,722 A 7/1989 Kent
5,329,579 A 7/1994 Brunson ............... 379/88.26
5,390,188 A 2/1995 Dawson
5,394,402 A 2/1995 Ross ..................... 370/402
5,442,624 A 8/1995 Bonomi et al. ........... 370/231
5,442,791 A 8/1995 Wrabetz et al. .......... 709/202

(Continued)

OTHER PUBLICATIONS

Weaver, Alfred C. and McNabb, James F., A Real-Time Monitor for Token Ring Networks, MILCOM 1989, p. 0794-0798.
Khan, A.; Al-Darwish, N.; Guizani, M.; Benten, M. and Youssef, H., Design and Implementation of a Software Bridge with Packet Filtering and Statistics Collection Functions, Int'l Journal of Network Mgmt., vol. 7, pp. 251-263, 1997.
Tigli, O. and Chaudhry, G. M., Wrap-around Type Switch for ATM, Electronics Letters, Mar. 27, 1997, vol. 33, pp. 567-568.

(Continued)

*Primary Examiner*—Chi Pham
*Assistant Examiner*—Phuc Tran
(74) *Attorney, Agent, or Firm*—Wong, Cabello, Lutsch, Rutherford, & Brucculeri, LLP

(57) ABSTRACT

The present invention provides a system and a method for filtering a plurality of frames sent between devices coupled to a fabric by Fiber Channel connections. Frames are reviewed against a set of individual frame filters. Each frame filter is associated with an action, and actions selected by filter matches are prioritized. Groups of devices are "zoned" together and frame filtering ensures that restrictions placed upon communications between devices within the same zone are enforced. Zone group filtering is also used to prevent devices not within the same zone from communicating. Zoning may also be used to create LUN-level zones, protocol zones, and access control zones. In addition, individual frame filters may be created that reference selected portions of frame header or frame payload fields.

33 Claims, 23 Drawing Sheets

U.S. PATENT DOCUMENTS

| | | | |
|---|---|---|---|
| 5,519,695 A | 5/1996 | Purohit | 370/58.2 |
| 5,600,644 A | 2/1997 | Chang et al. | 370/404 |
| 5,751,715 A | 5/1998 | Chan et al. | 370/455 |
| 5,752,003 A | 5/1998 | Hart | 719/223 |
| 5,774,656 A | 6/1998 | Hattori et al. | 709/223 |
| 5,805,820 A | 9/1998 | Bellovin et al. | 709/225 |
| 5,805,924 A | 9/1998 | Stoevhase | 710/11 |
| 5,844,887 A | 12/1998 | Oren et al. | 370/218 |
| 5,872,822 A | 2/1999 | Bennett | 375/372 |
| 5,878,232 A | 3/1999 | Marimuthu | 709/249 |
| 5,894,481 A | 4/1999 | Book | 370/412 |
| 5,938,732 A | 8/1999 | Lim et al. | 709/229 |
| 5,941,972 A | 8/1999 | Hoese | |
| 5,944,798 A | 8/1999 | McCarty et al. | 709/251 |
| 5,968,125 A | 10/1999 | Garrick | 709/225 |
| 6,041,058 A | 3/2000 | Flanders | |
| 6,044,400 A | 3/2000 | Golan | |
| 6,128,298 A | 10/2000 | Wootton | |
| 6,173,399 B1 | 1/2001 | Gilbrech | 713/153 |
| 6,233,236 B1 | 5/2001 | Nelson | |
| 6,304,903 B1 | 10/2001 | Ward | |
| 6,401,128 B1 | 6/2002 | Stai | |
| 6,438,127 B1 | 8/2002 | Le Goff et al. | 370/389 |
| 6,477,204 B1 | 11/2002 | Fukushima et al. | 375/240.28 |
| 6,480,488 B1 * | 11/2002 | Huang | 370/389 |
| 6,587,463 B1 * | 7/2003 | Hebb et al. | 370/392 |
| 6,765,919 B1 | 7/2004 | Banks | |
| 6,980,525 B2 | 12/2005 | Banks | |
| 7,120,128 B2 | 10/2006 | Banks et al. | 370/254 |
| 7,151,778 B2 | 12/2006 | Zhu et al. | 370/422 |
| 7,167,472 B2 | 1/2007 | Wu et al. | 370/389 |
| 2001/0028652 A1 * | 10/2001 | Sakurai et al. | 370/395 |
| 2002/0159468 A1 * | 10/2002 | Foster et al. | 370/419 |
| 2003/0056040 A1 | 3/2003 | Manning | 710/52 |
| 2003/0095549 A1 | 5/2003 | Berman | |
| 2003/0126200 A1 | 7/2003 | Wolff | 709/203 |
| 2004/0030766 A1 | 2/2004 | Witkowski | 709/223 |
| 2004/0218593 A1 | 11/2004 | Hammons et al. | 370/386 |
| 2005/0018672 A1 | 1/2005 | Dropps et al. | 370/389 |
| 2005/0044354 A1 | 2/2005 | Hagerman | 713/160 |
| 2005/0169258 A1 | 8/2005 | Millet et al. | 370/389 |
| 2006/0072454 A1 | 4/2006 | Ain et al. | 370/230 |

OTHER PUBLICATIONS

Julkunen, Heikki and Chow, C. Edward, Enhance Network Security with Dynamic Packet Filter, Apr. 1997, 1-72.

Calderon, J. Carlos; Tapia, Jose M.; Corominas, Enric and Paris, Lluis, A Chip-Set Enabling B_ISDN ATM UNI Transmission Convergence (TC) AAL ¾ Layers and ATM Layer Functions, 1996 IEEE Solid State Circuits Conference, p. 116-117.

Irie, Kazunari; Sano, KAtsuhiko; Ohta, Norihisa; Suto, Kouichi and Tsuji, Hisao, Large Capacity Multiplex-Port Brouter for Regional PC Communication Network System and its Performance; Long Haul, ATM and Multimedia Networks, 1998, IOS Press, pp. 110-117.

Bellovin, Steven M. and Cheswick, William R., Network Firewalls, IEEE Communications Magazine, Sep. 1994, pp. 50-57.

Julkunen, Heikki and Chow, C. Edward, Enhance Network Security with Dynamic Packet Filter, IEEE, 1998, pp. 268-275.

McHenry, John T.;Dowd, Patrick W.; Pellegrino, Frank; Carozzi, Todd and Cocks, William, An FPGA-Based Coprocessor for ATM Firewalls, FPCCM, 1997, pp. 30-39.

Compaq; "SAN Switch Zoning—Reference Guide;" Sep. 1999.

"Fibre Channel Physical and Signaling Interface (FC-PH), Rev. 4.3;" Working draft proposed American National Standard for Information Systems; Jun. 1, 1994; 479 pages.

"Fibre Channel Switch Fabric (FC-SW), Rev. 3.3;" NCITS working draft proposed American National Standard for Information Technology; Oct. 21, 1997; 108 pages.

"Fibre Channel Fabric Generic Requirements (FC-FG), Rev. 3.5;" Working draft proposed American National Standard for Information Systems; Aug. 7, 1996; 35 pages.

"Fibre Channel Fabric Loop Attachment (FC-FLA), Rev. 2.7;" NCITS working draft proposed Technical Report; Aug. 12, 1997; 136 pages.

"Fibre Channel Generic Services—2 (FC-GS-2), Rev. 5.3;" NCITS working draft proposed American National Standard for Information Technology; Nov. 25, 1998; 106 pages.

Veritas; "Brocade Demonstrates Industry Support for Veritas' Storage Area Networking (SAN) Strategy;" Jul. 29, 1998.

US 6,147,676, 11/2000, Shand (withdrawn)

* cited by examiner

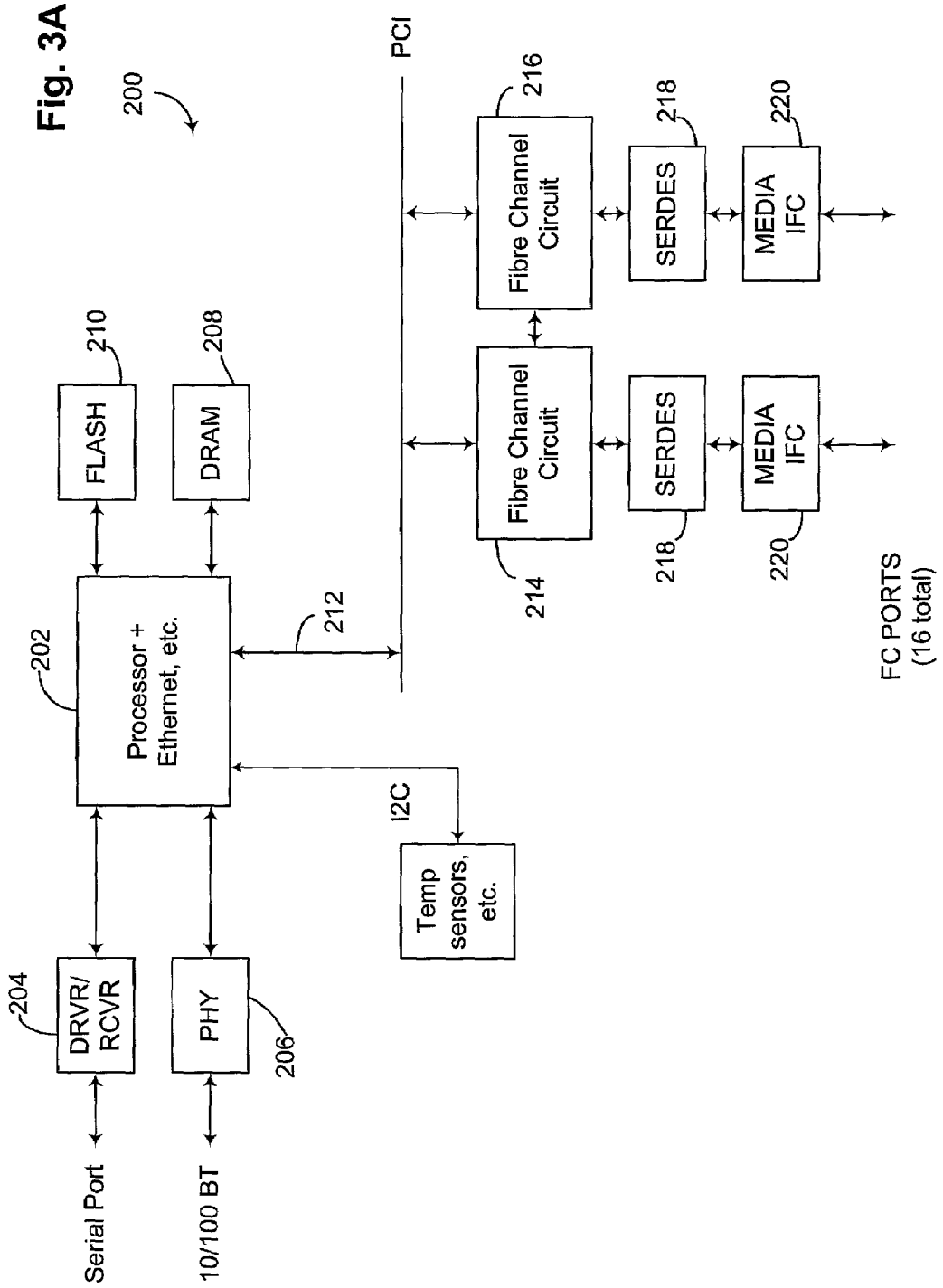

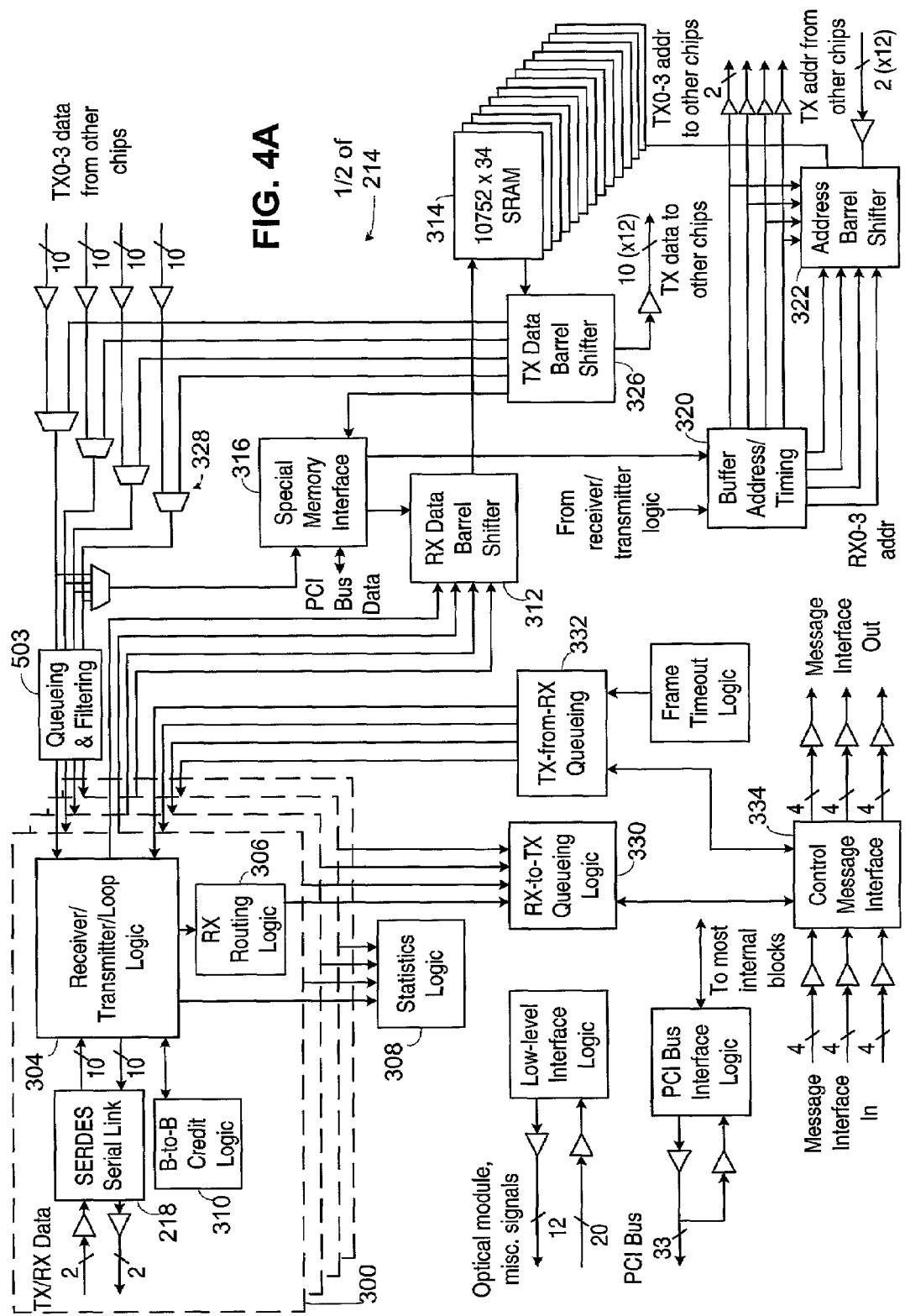

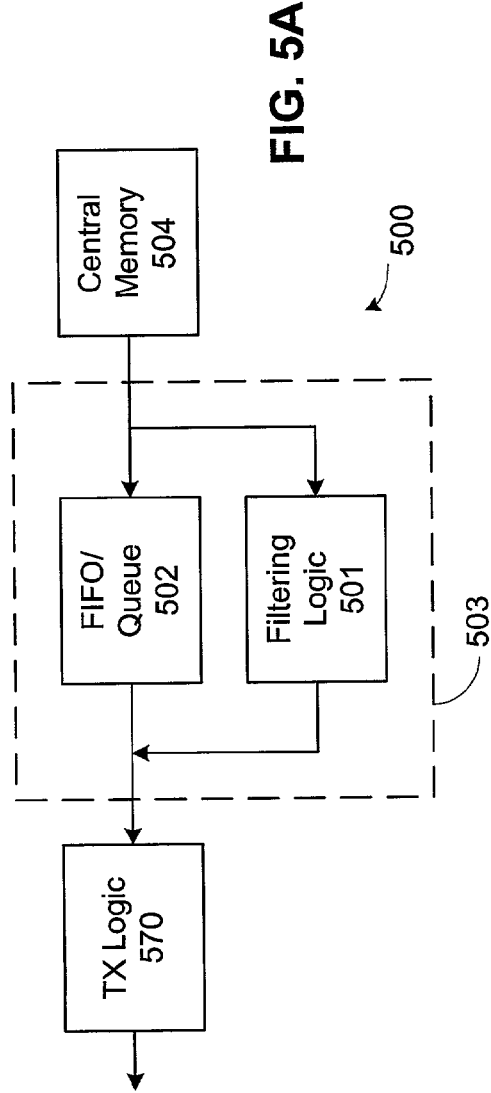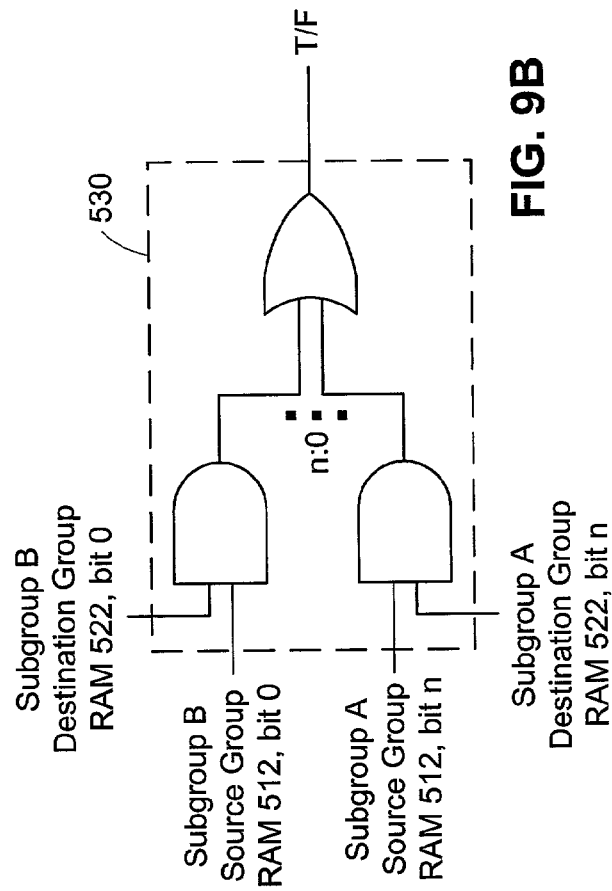

| Filter | R_CTL | D_ID | S_ID | FC_TYPE | FCP_LUN | FCP_CMD | Action | Comment |
|---|---|---|---|---|---|---|---|---|
| 1 |  | Dest. device | List of all allowed sources | BLS |  |  | Forward | ABTS, etc. |
| 2 |  | Dest. device | List of all allowed sources | ELS |  |  | Forward | PLOGI, PRLI, etc. |
| 3 | Unsolicited cmd | Dest. device | List of sources which may read | FCP | List of dest. LUNs | FCP_READ | Forward | Read I/O |
| 4 | Unsolicited cmd | Dest. device | List of sources which may write | FCP | List of dest. LUNs | FCP_WRITE | Forward | Write I/O |
| 5 | Unsolicited cmd | Dest. device | List of allowed sources | FCP |  | Neither FCP_READ nor FCP_WRITE | Send to processor | Report LUNs, Mode select |
| 6 | Status (resp) | Dest. device | List of allowed sources | FCP |  |  | Forward | Responses |
| 7 | Solicited data | Dest. device | List of allowed sources | FCP |  |  | Forward | Data frames |
| 8 | No match to any filter |  |  |  |  |  | Class 3: discard Class 2: send to processor | Illegal access: discard (class3) or reject (class 2) |

FIG. 11B

FIBRE CHANNEL ZONING BY LOGICAL UNIT NUMBER IN HARDWARE

CROSS REFERENCE TO RELATED APPLICATIONS

This application claims the benefit under 35 U.S.C. §119(e) of U.S. Provisional Patent Application Ser. No. 60/284,759 entitled "Frame Filtering, LUN Level Zoning and Performance Monitoring" by Jacqueline Yu, David C. Banks, Ding-Long Wu and Jieming Zhu, filed Apr. 18, 2001; Ser. No. 60/327,676 entitled "Frame Filtering and LUN Level Zoning" by Jacqueline Yu, David Banks, Ding-Long Wu and Jieming Zhu, filed Oct. 6, 2001; and Ser. No. 60/290,267 entitled "System and Method for Storing and Retrieving Multi-Speed Data Streams Within a Network Switch" by Kreg A. Martin and David C. Banks, filed May 10, 2001, which are hereby incorporated by reference, and is a continuation-in-part of Ser. No. 09/972,471, entitled "System and Method for Storing and Retrieving Multi-Speed Data Streams Within a Network Switch" by Kreg A. Martin and David C. Banks, filed Oct. 6, 2001, which is hereby incorporated by reference.

BACKGROUND OF THE INVENTION

1. Field of Invention

The present invention relates generally to a system for monitoring and filtering frames sent within a network system, and more particularly, to performing actions upon frames based upon individual frame contents.

2. Description of the Related Art

As the result of continuous advances in technology, particularly in the area of networking such as the Internet, there is an increasing demand for communications bandwidth. For example, the transmission of data over a telephone company's trunk lines, the transmission of images or video over the Internet, the transfer of large amounts of data as might be required in transaction processing, or videoconferencing implemented over a public telephone network typically require the high speed transmission of large amounts of data. Such applications create a need for data centers to be able to quickly provide their servers with large amounts of data from data storage. As such data transfer needs become more prevalent, the demand for high bandwidth and large capacity in data storage will only increase.

Efficient data storage and management are becoming increasingly important to business-critical decision-making. This data dependence has greatly increased the number of input and output transactions, or I/Os, required of computer storage systems and servers. As a result, organizations are being forced to dedicate substantial resources to managing and maintaining their storage systems.

Fibre Channel is a transmission protocol that is well-suited to meet this increasing demand, and the Fibre Channel family of standards (developed by the American National Standards Institute (ANSI)) is one example of a standard which defines a high speed communications interface for the transfer of large amounts of data via connections between a variety of hardware devices, including devices such as personal computers, workstations, mainframes, supercomputers, and storage devices. Use of Fibre Channel is proliferating in many applications, particularly client/server applications that demand high bandwidth and low latency I/O. Examples of such applications include mass storage, medical and scientific imaging, multimedia communications, transaction processing, distributed computing and distributed database processing applications.

In one aspect of the Fibre Channel standard, the communication between devices is based on the use of a fabric. The fabric is typically constructed from one or more Fibre Channel switches and each device (or group of devices, for example, in the case of loops) is coupled to the fabric. Devices coupled to the fabric are typically capable of communicating with every other device coupled to the fabric.

Conventional Fibre Channel systems freely pass frames from a source device to a destination device without individualized frame filtering or review. However, there are situations where the ability to freely communicate between all devices on a fabric is not desirable. For example, it may be desirable to screen off certain devices on a fabric in order to perform testing and/or maintenance activities on only those devices, without the risk of interfering with the other devices on the fabric. Devices may need to be segregated according to their operating system or other technical features. Certain devices may wish to receive only frames using a certain protocol. Access to or by certain devices may need to be restricted for security reasons. Additionally, the system may wish to monitor the characteristics of individual frames being sent within the fabric.

Conventional Fibre Channel fabrics do not support the filtering of individual frames from the hardware level. Devices can be prevented from communicating with each other typically only if they are actually physically separated (e.g., coupled to different fabrics). However, this method does not facilitate the ability to examine each frame and make individualized decisions concerning the actions to take for each frame.

In certain fabrics, this segregation, or zoning, can be accomplished by software present in the switches. An example of this operation is provided in U.S. patent application Ser. No. 09/426,567, entitled "Method and System for Creating and Formatting Zones Within a Fibre Channel System" by David Banks, Kumar Malavalli, David Ramsay, and Teow Kha Sin, filed Oct. 22, 1999, which is hereby incorporated by reference. The Simple Name Server present in the switches may provide software zoning providing only the information on devices that are in the zone during the log in processes of a device. However, software zoning is limited in that the entire fabric is still accessible to a "bad" device which otherwise determines devices present on the fabric. Thus, while software zoning is available, it is not sufficiently secure, and some sort of hardware protection mechanism using frame filtering is still needed.

Certain switches, such as the Silkworm 2800, provided by Brocade Communications, Inc. have limited hardware zoning which is accomplished by limited hardware frame filtering. This is also exemplified in U.S. patent application Ser. No. 09/426,567. When devices on a fabric are initialized, they receive a Worldwide Name (WWN). A portion of this WWN includes details on the domain and switch port to which they are connected. Those certain switches have the capability of monitoring the source and destination domain and port numbers of a packet and can perform zoning or filtering on that information. However, even though this port hardware zoning is a security improvement on the software zoning, it is still very limiting and is inflexible. Additionally, it is not as secure as desired, as any devices within the zone can communicate, so that the fabric must be organized so that devices do not contain material that must be secure from any other devices in the zone. This limits the end user's capabilities for designing their computer system, increasing costs and complexity.

Therefore, there is a need for improved frame filtering to be able to perform zoning at a more detailed level, particularly to the full WWN or to the logical unit number (LUN) level.

SUMMARY OF THE INVENTION

The present invention provides a system and a method for filtering a plurality of frames sent between devices coupled to a fabric by Fibre Channel connections to a very detailed level. Frames are reviewed against a set of individual frame filters. Each frame filter is associated with an action, and actions selected by filter matches are prioritized. Additional actions may be defined if a frame does not generate a filter match. Filtering actions include, but are not limited to, forwarding the frame, discarding the frame, performing additional processing upon the frame and creating new frame filters based upon the frame contents.

One technical aspect of frame filtering enables groups of devices to be "zoned" together, for example by WWN. At the hardware level, frame filtering of zone groups (used interchangeably with zone group filtering) ensures that restrictions placed upon communications between devices within the same zone are enforced. Zone group filtering is also used to prevent devices not within the same zone from communicating. Zoning accomplished by frame filtering may be further expanded to create LUN-level zones, protocol zones, and access control zones. In addition, individual frame filters may be created that reference selected portions of frame header or frame payload fields for zoning purposes.

Frame filtering is typically performed at or near wire speed. In order to provide for a rapid frame decision-making process, much of the frame filtering process is performed by hardware structures, thereby providing higher levels of security then conventional software zoning techniques and more flexibility and security than just port-based hardware zoning. Additionally, frame filtering in accordance with the present invention can be expanded beyond the limits of the physical hardware structures through the use of virtual frame filtering structures, thereby calling upon the kernel software layer to enable this feature.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3A is a more detailed block diagram of switches according to an embodiment of the present invention.

FIG. 4A is a more detailed block diagram of one-half of the chips of FIG. 4

FIG. 5A is a simplified block diagram of one embodiment of frame filtering logic contained in the transmit logic of FIG. 4A suitable for the switch of FIG. 4.

FIG. 9B is a logic diagram of one embodiment for implementing the zone group filtering logic of FIG. 9A.

FIG. 11B is a table listing an embodiment of a set of SCSI LUN zoning frame filters in accordance with the present invention.

Figure 1:
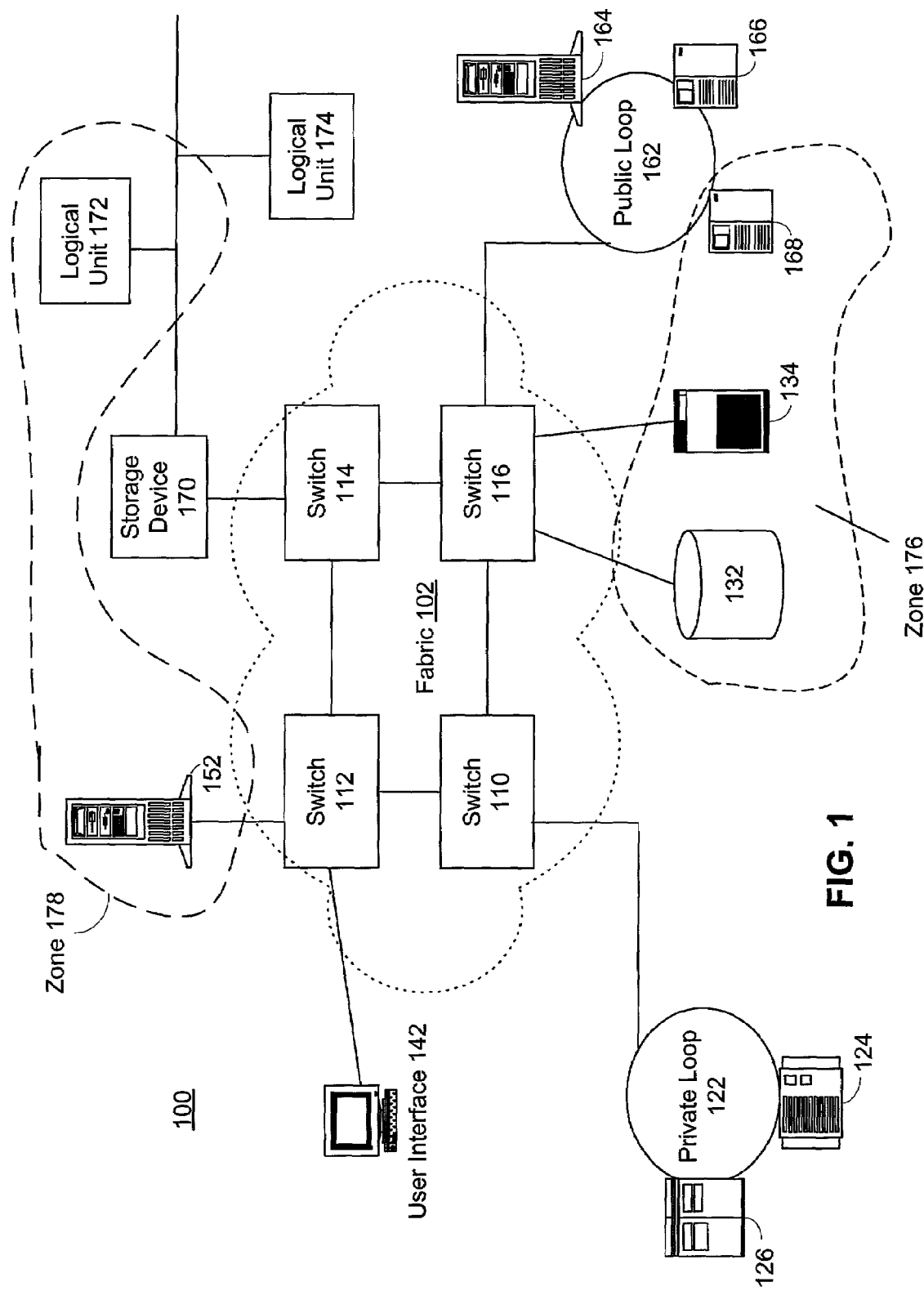
FIG. 1 illustrates a system diagram of a Fibre Channel network with a zone specified in an embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

A system and method for deterministically filtering and routing frames over a fabric in a Fibre Channel communications network is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Moreover, the present invention is claimed below as operating on or working in conjunction with an information system. Such an information system as claimed may be the entire frame filtering information system as detailed below in the described embodiments or only portions of such a system. For example, the present invention can operate with an information system that need only be a communications network in the simplest sense to detect and route information. Thus, the present invention is capable of operating with any information system from those with minimal functionality, to those providing all of the functionality disclosed herein.

Reference will now be made in detail to several embodiments of the present invention, examples of which are illustrated in the accompanying drawings. Wherever practicable, the same reference numbers will be used throughout the drawings to refer to the same or like parts. U.S. Pat. No. 6,160,813 assigned to the same assignee as the present case is hereby incorporated by reference in its entirety.

Fibre Channel Network Structure

FIG. 1 illustrates a Fibre Channel network 100 with zones 176 and 178 of devices specified in an embodiment of the present invention. Generally, the network 100 is connected using Fibre Channel connections (e.g., optical fiber and coaxial cable). In the embodiment shown and for illustrative purposes, the network 100 includes a fabric 102 comprised of four different switches 110, 112, 114, and 116. It will be understood by one of skill in the art that a Fibre Channel fabric may be comprised of one or more switches.

A variety of devices can be connected to the fabric 102. A Fibre Channel fabric supports both point-to-point and loop device connections. A point-to-point connection is a direct connection between a device and the fabric. A loop connection is a single fabric connection that supports one or more devices in an "arbitrated loop" configuration, wherein signals travel around the loop through each of the loop devices. Hubs, bridges, and other configurations may be added to enhance the connections within an arbitrated loop.

On the fabric side, devices are coupled to the fabric via fabric ports. A fabric port (F_Port) supports a point-to-point fabric attachment. A fabric loop port (FL_Port) supports a fabric loop attachment. Both F_Ports and FL_Ports may be referred to generically as Fx_Ports. Typically, ports connecting one switch to another switch are referred to as expansion ports (E_Ports).

On the device side, each device coupled to a fabric constitutes a node. Each device includes a node port by which it is coupled to the fabric. A port on a device coupled in a point-to-point topology is a node port (N_Port). A port on a device coupled in a loop topology is a node loop port (NL_Port). Both N_Ports and NL_Ports may be referred to generically as Nx_Ports. The label N_Port or NL_Port may be used to identify a device, such as a computer or a peripheral, which is coupled to the fabric.

Loop devices (NL_Ports) coupled to a fabric may be either "public" or "private" devices that comply with the respective Fibre Channel standard (e.g., Fabric Loop Attach standard FC-FLA, or Fibre Channel Private Loop Direct Attach FC-PLDA, respectively). Those skilled in the art will be familiar with the configurations for enabling public and private devices to operate in compliance with ANSI specifications (e.g., X3.272 1996; T11 project 1133-D) and the NCITS specification (e.g., NCITS TR-20 1998; NCITS TR-19 1998).

Typically, private loop devices cannot log into an attached fabric and are thus incapable of communicating with other fabric devices. However, a well-suited method for allowing private loop devices to communicate with public fabric-attached devices is disclosed in commonly assigned U.S. patent application Ser. No. 09/370,095, entitled "System and Method for Sending and Receiving Frames Between a Public Device and a Private Device," by Stai, et al., filed on Aug. 6, 1999, the subject matter of which is hereby incorporated by reference in its entirety. In general, private addresses reside at the "end points" of the fabric, and upon entering a loop, frames having the format of the private address are transformed to a format associated with a public address. This implies that there is a representation of private traffic in a public format when a frame navigates through a loop. Thus, the discussion of frame filtering to follow applies to both public and private devices attached to a fabric, as well as to frames having a representation in a public format of a private address.

In the embodiment shown in FIG. 1, fabric 102 includes switches 110, 112, 114 and 116 that are interconnected. Switch 110 is attached to private loop 122, which is comprised of devices 126 and 124. Switch 112 is attached to device 152. Switch 114 is attached to device 170, which has two logical units 172, 174 attached to device 170. Typically, device 170 is a storage device such as a RAID device, which in turn may be logically separated into logical units illustrated as logical units 172 and 174. Alternatively the storage device 170 could be a JBOD or just a bunch of disks device, with each individual disk being a logical unit. Switch 116 is attached to devices 132 and 134, and is also attached to public loop 162, which is formed from devices 164, 166 and 168 being communicatively coupled together. A user interface 142 also connects to the fabric 102.

Overview of Zoning within the Fibre Channel Network

Zoning is a fabric management service that can be used to create logical subsets of devices within a Storage Area Network, and enables the partitioning of resources for the management and access control of frame traffic. A suitable method, performed at the software level (and referenced to herein as "software zoning" or high-level software zoning), for the partitioning of fabric devices into several types of zones is disclosed in commonly assigned U.S. Pat. application Ser. No. 09/426,567 referenced above. In general, the software sets up zones according to several different methods for specifying devices, including: (1) World Wide Name (WWN)-level zoning and (2) port-level zoning. Generally, WWN-level zoning and port-level zoning may coexist across a fabric or a switch so long as they do not overlap with each other over a port. These various types of zoning are further discussed below.

1. World Wide Name (WWW)-Level Zoning

A WWN uniquely identifies a Fibre Channel node or port on a device. World Wide Names are specified as eight hex numbers separated by colons, for example 10:00:00:60:69: 00:00:8A. When a device is a zone member having a Node World Wide Name, all ports on that device are specified for that corresponding zone. When a device is a zone member having a Port World Wide Name, a single port on the device is specified for that corresponding zone. Specifying zone members by World Wide Name is advantageous because, for example, a device which is so specified may be coupled to the fabric at any point or via any fabric element and it will retain the same zone membership.

2. Port-Level Zoning

Port-level zoning is used when the fabric user has physical fabric port-level knowledge as to how the devices within the desired zone are grouped. Physical fabric port numbers are specified as a pair of decimal numbers "s,p", where "s" is the switch number which may be indicated by a domain ID, and "p" is the port number on that switch. For example, "2,12" specifies port 12 on switch number 2. When a zone member is specified by a physical fabric port number, then any and all devices connected to that port are in the zone. If this port is an arbitrated loop, then all devices on the loop are in the zone.

Overview of Frame Filters For Enabling Zoning

In accordance with the present invention, the creation of one or more sets of different frame filters are undertaken to trap selected frames sent within a Fibre Channel fabric system and to perform different actions based upon the selected frames. As will be discussed later in detail, frame filters may be based upon a variety of different frame characteristics, including the class of service of a frame, the frame header information, and the frame payload data (e.g., up to 2112 bytes according to the Fibre Channel standard). Generally, the overall objective of the frame filtering schemes described herein is to discern and subsequently manipulate the most frequently encountered frames in the switch hardware so as to maximize network communication performance.

One aspect of a frame filtering system and method in accordance with the present invention is the filtering of frames at wire speed. Wire speed is defined to mean the rate of data transfer that a given telecommunication technology (herein, Fibre Channel) provides at the physical wire level. Fibre Channel networks can support large data block transfers at gigabit speeds. Thus, implementing frame filtering on a Fibre Channel network is a highly-attractive feature because frame-to-frame filtering can be performed at various wire speed throughputs (e.g., 1, 2, and 10 Gbps), thereby improving communication speed.

One aspect of frame filtering, in accordance with the present invention, enables more sophisticated and more flexible zoning to be implemented at the hardware level. This aspect of the present invention is beneficial because it improves security of communications in a Fibre Channel network.

Another aspect of frame filtering in accordance with the present invention increases the variety of parameters that can be used to create zone groups. Previously, such parameters were unavailable with conventional software or prior hardware zoning techniques. With the present invention, zoning performed with frame filtering can be used to set up barriers between systems of different operating environments: (1) to deploy logical subsets of the fabric by creating closed user groups with a finer granularity; and (2) to create a variety of test and/or maintenance areas that are separate from the rest of the fabric. Additionally, frames may be filtered based on the class of service, frame header and a certain number of bytes of optional header or data.

Still referring to FIG. 1, a zone 176 is configured within the fabric 102. Zone 176 includes devices 132, 134 and device 168, which forms a part of the arbitrated loop 162. Similarly, zone 178 includes device 152 and logical unit 172. A zone indicates a group of source and destination devices allowed to communicate with each other. A zone group can be implemented with filters set up to operate on frames sent between the devices in the group. Source devices are identified by a source identifier (S_ID), and destination devices are identified by a destination identifier (D_ID).

In one embodiment, the fabric can be configured by default to discard frames not sent within the same zone group. More particularly, those devices within a zone group can be permitted to communicate with each other by filtering out frames sent between source and destination devices not within the same zone. For example, referring to system 100, only frames within zones 176 and 178 will be delivered, namely those frames sent between devices 132, 134 and 168 and these between device 152 and logical unit 172. Accordingly, all other communications involving devices outside zones 176 and 178 will be discarded. By contrast, in another embodiment, the fabric may also be set up by default to forward all frames not within a zone group. In yet another embodiment, with reference to system 100, frames sent between devices within a zone (e.g., 176 or 178) will be allowed to pass only if they meet a particular frame filter criteria, such as a read-only communication. In the situation where the default action for frames in different zone groups may be set to forward the frame, communications involving any devices outside the zone (e.g., 176 or 178) will proceed to be forwarded normally, and will not be subject to the "read-only" screening criteria.

Additional Levels of Zoning

In accordance with one aspect of the present invention, once the devices within a zone have been specified using zoning to select either WWN-level or port-level, and corresponding identifiers, additional subsets may be added to the zone configuration further designating the type of filter to place on the devices within the zone. This additional designation of zone groups of devices can be based upon filtering certain types of frames sent within the zone, and provides additional variety of zoning functionality previously unavailable with conventional zoning techniques. For example, frames may be filtered based upon one type of frame information, namely where logical unit number (LUN) information is specified, thereby allowing devices to be zoned at the LUN-level. Furthermore, frames can be filtered based on other types of frame information, namely enabling protocol-level zoning and access control level zoning. Still further, frame filters may also be created to track different frame attributes for use in monitoring the performance of the Fibre Channel network system. Generally, to implement these additional levels of zoning, and as will be described in further detail subsequently, a frame filter is set to reference a certain portion of a Fibre Channel frame by specifying a particular frame offset and mask value.

A. LUN-Level Zoning

LUN-level zoning is implemented with filtering associated LUN information specified for the frame. For example, the information specified can include the device identifier information. Since the format of LUN information for the Fibre Channel protocol (FCP) is vendor-specific and requires different types of filters to check those bytes amongst the 8-byte LUN field for the FCP, zoning firmware (i.e., the kernel software) will translate the LUN information within the filter specification to ensure that the proper mask and offset information is applied to the FCP LUN field. It is noted that LUN information may be stored differently among different vendors.

For SCSI Logical Unit zoning, an independent set of source devices is allowed access to each Logical Unit within a storage device. To keep track of the devices which are allowed to perform input/output (I/O) operation to the LUN, an access list for each Logical Unit having the source IDs (S_ID) of the devices can be maintained.

It is desirable in some instances, to allow some devices read access, but not write access to certain LUNs within the SCSI storage device. In order to implement SCSI LUN-level zoning in a manner which maximizes the probability that host adapter drivers will be able to communicate with a LUN-zoned storage device, certain commands directed at the storage device are forwarded to the switch processor (to be described subsequently), like for example, the Report LUNs SCSI command. A determination is made as to which LUNs within the device the source of the command is allowed to access; as part of the kernel software (i.e., firmware) implementation in accordance with the present invention, this set of LUNs can be returned as part of a function call in the response to the intercepted Report LUNs command, thereby masking the availability of those Logical Units that the host is not allowed to access.

The particular action to be undertaken can be one of a variety of actions, including forwarding a frame, sending a frame to a processor, discarding a frame and rejecting a frame. Certain fields can be examined to determine a particular instruction to be undertaken. For example, the routing control (R_CTL) field indicates commands, responses and data. The destination device address (D_ID) field indicates the address of the device that the frame is destined for. The source device address (S_ID) field identifies the source device in order to determine whether the source device is allowed access to the zone. The FC_TYPE field identifies a frame protocol. FCP_CMND frames are those frames that have FC_TYPE=8 and R_CTL=8. For FCP_CMND frames, the FCP_LUN field is a Logical Unit Number identifier. The FCP_CMND field includes a SCSI command field with read and write indicators. It is noted that additional fields can also be considered.

This application of frame filtering for LUN-level zoning is beneficial for handling the most frequently encountered frames in the hardware so as to maximize performance. Other commands, especially those that require higher level processing in order to issue proxy responses (e.g., altering a Report LUNs command to only report LUNs the initiator is permitted to access) are forwarded to the switch processor for handling. It is noted that when implementing SCSI LUN-level zoning, performance-sensitive commands include SCSI read commands, SCSI write commands, and certain error recovery frames (e.g., Abort Sequence Basic Link Service). These commands are preferably handled in the hardware.

B. Protocol-Level Zoning

Protocol-level zoning is implemented with filtering that allows frames associated with a particular Fibre Channel protocol (e.g., FC-4, FCP-SCSI, FC-IP) to be forwarded to their destination device, while frames associated with other protocols to be discarded or rejected. This is desirable for applications such as those where storage and clustering traffic coexist on the same fabric so that the filtering function can prevent storage devices from receiving undesired clustering traffic.

Protocol filtering examines the FC_TYPE of the frame to determine whether the frame matches a particular filter or not, although other frame fields may certainly be examined as part of the filtering process. As an example, in the particular situation where a SCSI device is to be protected from non-SCSI traffic, the following FC-TYPEs can be filtered to allow the frame to be forwarded: FC_TYPE=0

(basic link services); FC_TYPE=1 (extended link services); and FC_TYPE=8 (FCP). Frames with other FC_TYPEs can be accordingly rejected.

C. Access Control Level Zoning

Access control filtering distinguishes between read-only, write-only, and read/write types of frames. For example, with an FCP command, the frames contain the SCSI format in the payload (i.e., byte 0, SCSI CDB), which can be used to identify that access control is activated.

In addition to the subsets of filters previously described for LUN-level, protocol-level, and access control level zoning, additional individual filters may be set up for frames being passed between devices within a designated zone. For example, one individual frame filter can compare a particular frame offset location and mask against a pre-specified value to determine if there is a match. Pre-specified actions are then undertaken based upon whether or not a match was achieved. A combination of various frame filters can be set up to examine any portion of the frame.

Zoning Configurations

In order to fully specify a frame filtering configuration for the fabric according to the preferred embodiment, two different sets of configuration information can be specified. A first set of information is the zone type and the second set of information is the zone group setup. As will be discussed below, the zone group and zone type should be configured and initialized at the port transmitting the frames. The operations could also be performed at the port receiving the frames or any intermediate port, but such arrangements would be more complicated so the transmit port location is preferred.

A. Zone Type

Configuration of the zone type setup entails actions being defined based upon zone group hits and misses, along with a predetermined number of field hits and misses (e.g., 16), where preferably the size of each field can be up to the maximum frame size allowed by Fibre Channel. Each of the fields is compared against possible filter values (e.g., up to four). The actions defined for filter "hits" and "misses" comprise: (1) forwarding the frame; (2) discarding the frame; (3) setting up additional filters; and (4) sending the frame to an embedded processor for a final decision. Setting up a zone type can be implemented in a variety of manners. For example, configuring a zone type can be a simple instruction to forward any frame with a particular zone group hit. As a more complex example, configuration of a zone type can include an instruction to forward all the FCP-DATA, RESPONSE, and TRANSFER READY frames regardless of their zone group hit or miss determinations, since these frames are solicited frames in the FCP context. One reason for doing so stems from the notion that if the FCP-CMD frame that solicited these (FCP-DATA, RESPONSE, and TRANSFER READY) frames is able to enter the zone, then other types of frames (i.e., FCP-DATA, RESPONSE, and TRANSFER READY) should be able to as well. Generally though, zone type specification can be configured for port-level zoning or WWN-level zoning, along with a zone suffix specification indicating LUN-level zoning, protocol-level zoning and access control level zoning. Correspondingly, filters for the specified zone type can be setup for a port.

B. Zone Group

Configuration of the zone group encompasses a set of fields with certain properties and values being grouped into a zone. For example, these fields can include S_ID, D_ID, LUN, and FC_TYPEs. More specifically, the zone group specifies the sets of source and destination devices (e.g., indicated by S_ID and D_ID) that can communicate with each other, including a specific LUN and FC_TYPE, if these fields are to be specified. A frame communication that falls within a specified zone group is referred to as a "zone group hit" whereas a frame communication that does not fall within a specified zone group is referred to as a "zone group miss."

Furthermore, zone groups can be divided into multiple subgroups, where a hit or miss can be used to determine a hit or miss of a filter. An example of the use of subgroups is for access control filtering. In a particular implementation of these subgroups, one subgroup could be used as a read only zone group, while the other subgroup could be used as a read/write zone group. Hardware constraints which limit the number of zone groups shared by a limited number of physical ports can be overcome by virtual translation in the firmware (as will be discussed subsequently).

C. Zoning Examples

For WWN-level zoning, all involved ports in the fabric are configured with the zone type of WWN zoning. As an example, for WWN-level zoning, after the zone type configuration, zone groups should be configured (if any) based on information from the name server. Otherwise, for those devices not yet logged into the name server, configuration should be implemented after the devices log into the fabric and name server.

For port-level zoning, the zone type and corresponding zone groups are configured at all ports in which port-level zoning is involved. The frame filter can be set up such that the zone group is always used to determine whether a frame is to be forwarded or discarded, whether the frame is solicited or unsolicited in the FCP context. For example, certain field bits (e.g., the higher 16-bits of the S_ID field of each frame can be checked against other bits in another field (e.g., the higher 16-bits of the D_ID field). If there is a match of these parameters to the zone group, the frame will be forwarded.

For LUN-level zoning, in addition to the filter set up as described above, the FC_TYPE and up to four bytes into the LUN fields can be used to determine a zone group hit or miss. In this particular implementation, LUN information can be used in specifying the zone group members.

One Implementation of Frame Filtering

Figure 2:
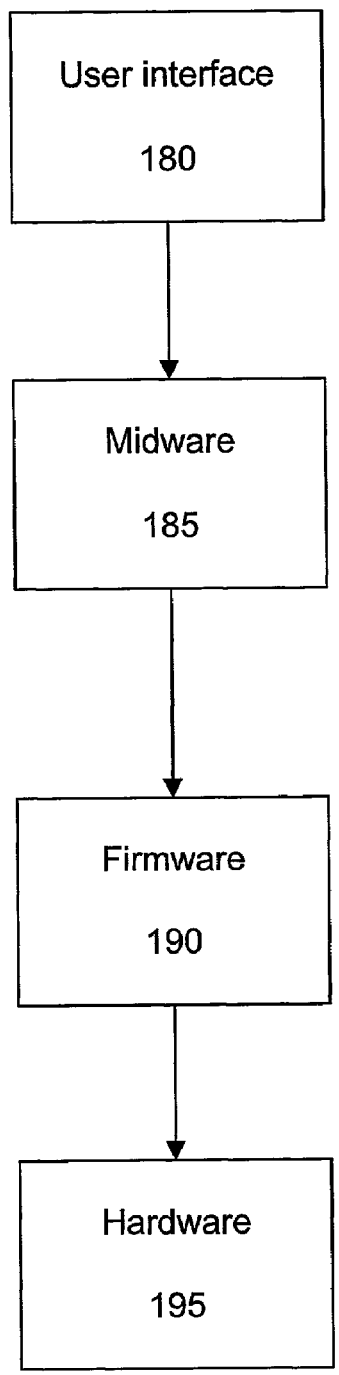
FIG. 2 is a data flow diagram illustrating one manner for specifying frame filtering and monitoring within the fabric in an embodiment of the present invention.

FIG. 2 illustrates a data-flow diagram of one manner that is suitable for programming a Fibre Channel fabric at the hardware level with frame filtering capabilities in accordance with the present invention. Zone group and zone type configuration information are entered into a user interface 180, which may log into any switch within the fabric 102 to enter the configuration information. Referring back to FIG. 1, various fabric zone configurations can be input into fabric 102 through user interface 142 to allow a user to select different types of frame filtering capabilities. In one embodiment, user interface 142 establishes a command-based Telnet session with fabric 102. In another embodiment, the user interface 142 comprises a Web-based interface allowing a user to select the configuration of fabric 102 through point-and-click and dialog sessions. One of skill in the art will recognize that various other embodiments of a user interface 142 suitable for configuring a fabric with frame filtering will work suitably-well with the present invention.

Referring back to FIG. 2, the configuration information is sent to the frame filtering midware software 185, which is resident on one or more of the switches within the fabric. The midware manages zones at the fabric level. The midware checks for zone conflicts and warns the user if any conflicts exist. It is noted, however, that WWN-level zoning conflicts cannot be checked until all devices log into the fabric. Thus conflicts arising from improper WWN zoning inputs are flagged to the user at a later time. For WWN-level zoning, the zone group may be completed after the devices log into the fabric.

The midware software sets up zone groups and any zone that conflicts with another zone will not be set up. The midware software also determines what type of zoning each port is supposed to enforce. At the level of the midware, the zone type configuration setup can be abstracted into zone type specification (e.g., port-level zoning or WWN-level zoning) along with a zone suffix specification (e.g., LUN level zoning, protocol level zoning and/or access control.)

The frame filtering firmware 190 (used interchangeably with "kernel software"), resident on each individual switch, receives midware information that is relevant to the zoning and filter setup for that particular switch. The switch firmware 190 programs the final frame filters into the appropriate switch hardware 195. The physical hardware 195 (used interchangeably with "real hardware") performs the frame filtering actions in accordance with the present invention, although certain types of frames are sent to the switch processor (to be described subsequently) for additional manipulations when necessary.

It is noted that the hardware 195 resident on the switch is a finite resource, and only a limited number of frame filters or zone groups can reside in the hardware 195 at any given time. If additional frame filters or zone groups are desired, they may be stored in the firmware 190 as "virtual" storage and may be input into the real hardware 195 when necessary. The real hardware structures represented by hardware 195 will be described first herein, followed by the initialization routines for both the real hardware and "virtual" memory structures.

A. An Embodiment For Hardware 195

Figure 3:
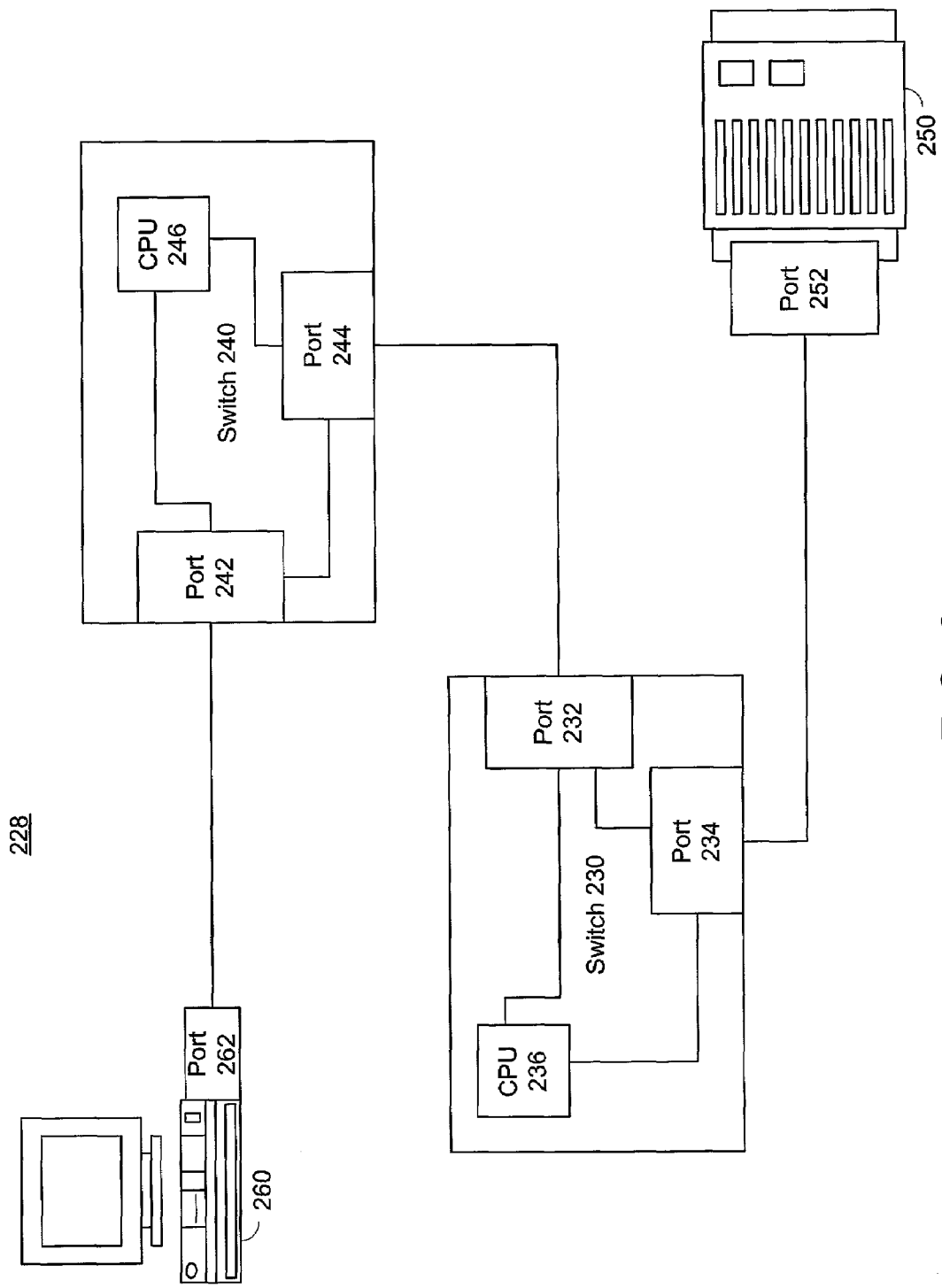
FIG. 3 is a block diagram of a system indicating an example of the connections within a Fibre Channel fabric according to an embodiment of the present invention.

FIG. 3 is a block diagram of a system 228 indicating an example of the connections used within a Fibre Channel fabric according to an embodiment of the present invention. In the example shown, system 228 includes two switches 240 and 230, a device 260 and a device 250. Switch 240 includes a central processing unit (CPU) 246 for managing its switching functions, and switch 230 includes a CPU 236 for managing its switching functions. Switch 240 includes two ports 242 and 244; switch 230 includes two ports 232 and 234. The number of ports shown on each switch is purely representative; and it will be evident to one of ordinary skill in the art that a switch may contain more or fewer ports. Device 260 is communicatively coupled via its node port 262 to port 242 on switch 240. Device 250 is communicatively coupled via its node port 252 to port 234 on switch 230. Switch 240 and switch 230 are interconnected via ports 244 and 232.

In this particular implementation, frame filtering is performed at the port where a frame is to be transmitted out of a switch, hence the configuration of the zone groups and zone types are set up at the transmitting port of a frame. Two examples are provided for illustration. In one example, the source and destination ports are within the same switch. More specifically, a frame is traveling from port 242 to port 244, where port 244 is the transmitting or egress port from the point of view of switch 240. In this example, the zone types and corresponding zone groups are set up on port 244. In another example, the destination port is across multiple switches. More specifically, a frame is traveling from device 260 to device 250. Fabric ports are candidates for frame filtering set-up. Within the fabric, the frame travels from port 242, to port 244, to port 232, and to port 234. Zone group and zone type information may be configured on either port 242 of switch 240 or port 234 of switch 230. However, it is generally preferable to set up frame filtering at the end point of the destination path (i.e., port 234 in this example.) A fabric may contain multiple paths to reach a destination device across the switches comprising the fabric, and therefore it is prudent to set up frame filtering at the fabric end point connection to the destination device to ensure that all frames traveling on all routes to the destination device are properly filtered.

FIG. 3A illustrates a basic block diagram of a switch 200, such as switches 110, 112, 114, 116, 230 or 240 according to the preferred embodiment of the present invention. A processor and I/O interface complex 202 provides the processing capabilities of the switch 200. The processor may be any of various suitable processors, including the Intel i960 and the Motorola PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210, are connected to the processor complex 202 to provide memory to control and be used by the processor.

The processor complex 202 also includes an I/O bus interface 212, such as a PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices.

B. Configuration of a Switch

Figure 4:
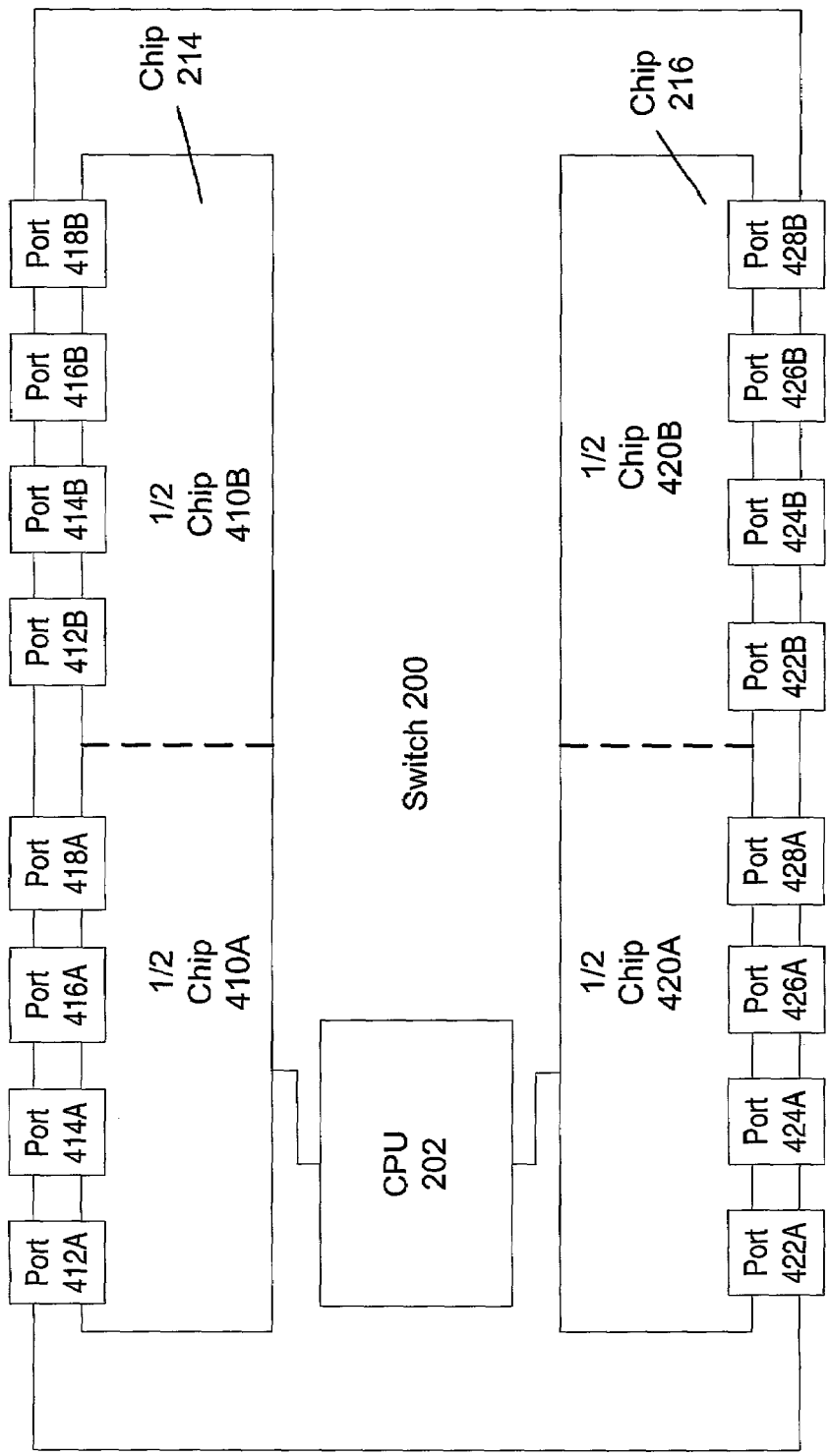
FIG. 4 is a block diagram of one embodiment of a switch suitable for frame filtering in accordance with the present invention.

FIG. 4 is a block diagram of one embodiment of a switch 200 suitable for performing frame filtering in accordance with the present invention. Switch 200 includes a processor, namely CPU 202, and two Fibre Channel integrated circuit "chips" 214 and 216, which chips may be referred to as "Bloom" chips. Logically, the chips 214 and 216 are divided into "half-chips" that are each capable of supporting frame filtering for four different ports. Chip 214 includes two half-chips 410A and 410B. Half-chip 410A supports ports 412A, 414A, 416A and 418A. Half-chip 410B supports ports 412B, 414B, 416B and 418B. Chip 216 includes two half-chips 420A and 420B. Half-chip 420A supports ports 422A, 424A, 426A and 428A. Half-chip 420B supports ports 422B, 424B, 426B and 428B. In the example used herein, the frame filtering logic is duplicated for each half-chip. Each half-chip is capable of supporting four ports, and thus the half-chip based logic is referred to as "quad-based" logic. Certain parts of the frame filtering logic are duplicated for each port, and this logic is "port-based" logic.

FIG. 4A illustrates a simplified block diagram of one-half of the preferred embodiment of the Fibre Channel circuits 214 and 216. Thus FIG. 4A is duplicated inside each Fibre Channel circuit 214, 216. Various components serve a similar function as those illustrated and described in U.S. Pat. No. 6,160,813, which is hereby incorporated by reference in its entirety.

Each one-half of Fibre Channel circuit 214 and 216 includes four identical receiver/transmitter circuits 300, each circuit 300 having one Fibre Channel port, for a total of four Fibre Channel ports. Each circuit 300 includes a SERDES serial link 218, preferably located off-chip but illustrated on chip for ease of understanding; receiver/transmitter logic 304 and receiver (RX) routing logic 306. Certain operations of the receiver/transmitter logic 304 are described in more detail below. The receiver routing logic 306 is used to determine the destination physical ports within the local fabric element of the switch 200 to which received frames are to be routed.

Each receiver/transmitter circuit 300 is also connected to statistics logic 308. Additionally, Buffer-to-Buffer credit logic 310 is provided for determining available transmit credits of virtual channels used on the physical channels.

Received data is provided to a receive barrel shifter or multiplexer 312 used to properly route the data to the proper portion of the central memory 314. The central memory 314 preferably consists of thirteen individual SRAMs, preferably each being 10752 words by 34 bits wide. Each individual SRAM is independently addressable, so numerous individual receiver and transmitter sections may be simultaneously accessing the central memory 314. The access to the central memory 314 is time sliced to allow the four receiver ports, sixteen transmitter ports and a special memory interface 316 access every other time slice or clock period.

The receiver/transmitter logic 304 is connected to buffer address/timing circuit 320. This circuit 320 provides properly timed memory addresses for the receiver and transmitter sections to access the central memory 314 and similar central memory in other duplicated blocks in the same or separate Fibre Channel circuits 216, 218. An address barrel shifter 322 receives the addresses from the buffer address/timing circuits 320 and properly provides them to the central memory 314.

A transmit (TX) data barrel shifter or multiplexer 326 is connected to the central memory 314 to receive data and provide it to the proper transmit channel. As described above, several of the blocks of FIG. 3 can be interconnected to form a full eight port circuit or two eight port circuits. Thus transmit data for the four channels illustrated in FIG. 4A may be provided from similar other circuits.

This external data is multiplexed with transmit data from the transmit data barrel shifter 326 by multiplexers 328, which provide their output to the receiver/transmitter logic 304.

In a fashion similar to that described in U.S. Pat. No. 6,160,813, RX-to-TX queuing logic 330, TX-to-RX queuing logic 332 and a central message interface 334 are provided and perform a similar function, and so will not be explained in detail.

The half-chip logic that forms an integrated circuit as embodied in switch 200 of FIG. 4 and half-chip of FIG. 4A is purely illustrative. It will be evident to one of ordinary skill in the art that different types of chips may be designed to support frame filtering. For example, the chip may be designed to logically support more or fewer ports. The switch itself may include more or fewer chips per switch. Additionally, it will become evident that, for clarity and without loss of generality, only selected portions of switch 200 and half-chip are illustrated in FIGS. 4 and 4A.

C. Frame Filtering Logic for Implementing Zones

1. An Implementation for the Hardware

Referring to FIG. 5A, a simplified block diagram is illustrated for one embodiment of frame filtering logic 500 that can be included in hardware 195 for switch 200 in order to perform the filtering and routing of frames in accordance with the present invention. Frame filtering logic 501 is communicatively coupled to a FIFO memory 502; a central memory 504 which is equivalent to central memory 314; and transmit (TX) logic 570, which is contained in the receiver/transmitter loop logic 304. TX logic 570 is that component of switch logic which enables frames or primitive sequences to be transmitted to one or more destination devices according to Fibre Channel protocols. It is noted that FIFO 502 obtains the frame from central memory 504 and is synchronized with the filtering logic 501 in order to determine whether a frame should be transmitted or not from TX Logic 570. If the decision is made not to transmit the frame, the filtering logic 501 will send a signal to kill the frame at TX Logic 570, which is in the receiver/transmitter loop logic 304. The FIFO queue 502 and Filtering Logic 501 are logically grouped together to form block 503, which is located in the transmit data path just before the receiver/transmitter logic 304.

Figure 5B:
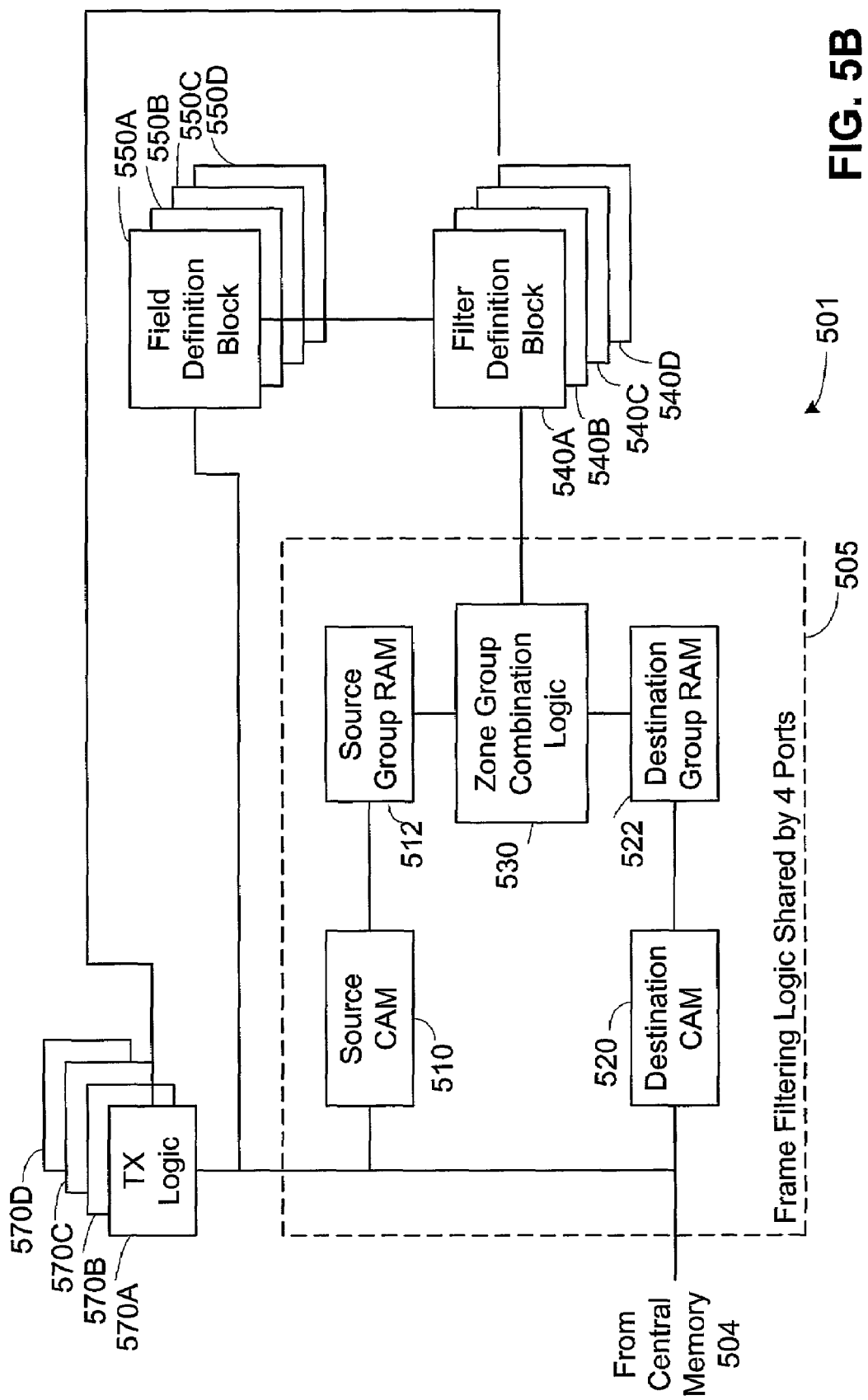
FIG. 5B is a detailed block diagram of the frame filtering logic of FIG. 5A.

In FIG. 5B, a block diagram of an embodiment for the logic of block 501 of a half-chip 410A suitable for frame filtering in accordance with the present invention is shown. Block 501 is connected to central memory 504, which feeds portions of the data stream into zone group frame filtering logic 505 for analysis. The zone group frame filtering logic 505 receives various fields from a transmitted frame and applies them to different frame filtering blocks, as described below.

Within the half-chip 410A, the set of zone group based filtering logic 505 includes a source content addressable memory (CAM) 510 (SCAM 510) and a destination CAM 520 (DCAM 520), a source group random access memory (RAM) 512, a destination group RAM 522, and zone group combination logic 530. In the embodiment shown, the zone group based filtering logic 505 is quad-based logic and shared by all four ports in the quad, although it will be understood by one of skill in the art that the filtering logic may be designed to support more or fewer ports. Half-chip 410A also includes four sets of port-based logic (corresponding to the four ports of half-chip 410A, as shown in FIG. 4). The central memory 504 is coupled to field definition blocks 550A, 550B, 550C and 550D. Each field definition block 550A-D can be implemented as a set of 16 field control registers indicating which frame sections to examine. For discussion purposes herein, field definition blocks 550A-D will be used interchangeably with field control registers. The outputs of the field definition blocks 550A, 550B, 550C, and 550D are coupled to filter definition blocks 540A, 540B, 540C and 540D, as is the output of the zone group combination logic 530. Each filter definition block 540A, 540B, 540C and 540D specifies a set of individual frame filters, for example 32 frame filters. Individual frame filters are configured to receive the output of the zone group logic 530 and from a field definition block 550A, 550B, 550C or 550D. Each individual frame filter combines a group of field control register hits or misses with hits or misses generated in the zone group combination logic 530. Along with the individual frame filter criteria already discussed, an action is also specified for each individual filter.

In the following discussion, the zone group based filtering logic 505 will be discussed first, followed by the field definition blocks 550A-D and the filter definition blocks 540A-D. The zone group based filtering logic 505 is used to find intersections between lists of specific frame fields. This is done by using CAMs 510 and 520, each of which contains a collection of frame fields from each of the lists to be analyzed. For example, with SCSI LUN level zoning, the SCAM 510 normally contains the set of 24-bit Fibre Channel frame S_IDs that comprise all access lists for LUNs serviced by the frame filtering logic. In addition, each entry in the DCAM 520 contains a Fibre Channel frame D_ID plus a SCSI LUN within the corresponding destination device. In this manner, the DCAM 520 contains the entire set of SCSI LUNs across multiple SCSI targets that may be processed by the frame filtering logic. This is shown diagrammatically in FIG. 6.

One manner for implementing the zone group based filtering logic 505 is discussed as follows. SCAM 510 lists S_ID and FC_TYPE sets indicating source devices (with an optional FC_TYPE specification) that have some type of frame filtering logic specified for at least one of the ports attached to the half-chip containing this SCAM 510. For example, the DCAM 520 lists LUN number, physical transmitter port, FC_TYPE and D_ID sets to indicate the relevant destination targets for the group filtering logic 501. If a particular FC_TYPE specification is not desired, a "protocol wildcard" (e.g., FC_TYPE=FF) may be enabled so that the FC_TYPE in the frame header will not be checked in order to obtain a CAM hit. The source group RAM 512 includes two zoning group bitmaps, namely Subgroup A and Subgroup B. Bits are set in each zoning group bitmap to indicate to which of the Subgroup zones the corresponding S_ID belongs. The destination group RAM 522 also includes two zoning group bitmaps, namely Subgroup A and Subgroup B. Bits are set in each zoning group bitmap to indicate to which of the Subgroup zones the corresponding D_ID belongs.

In one embodiment of the present invention: SCAM 510 includes 64 entries for the S_ID and FC_TYPE; DCAM 520 includes 512 entries of the LUN number, physical transmitter port, FC_TYPE, and D_ID; the source group RAM 512 contains 128 entries of Subgroups A and B; and the destination group RAM 522 contains 128 entries of Subgroups A and B.

2. Operation of Frame Filtering

Figure 6:
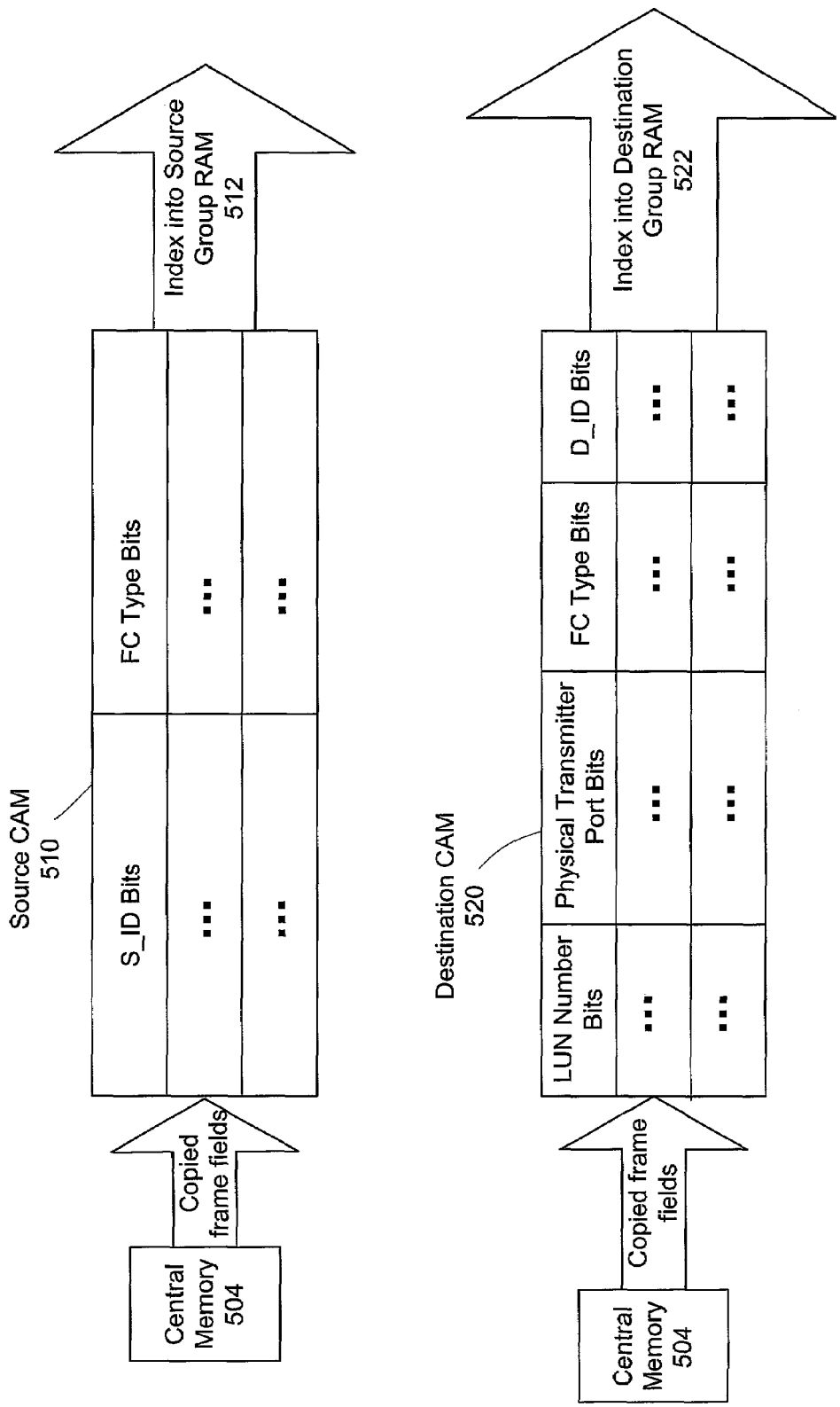
FIG. 6 is a block diagram of an embodiment of the source and destination content-addressable memories of FIG. 5B.
Figure 8:
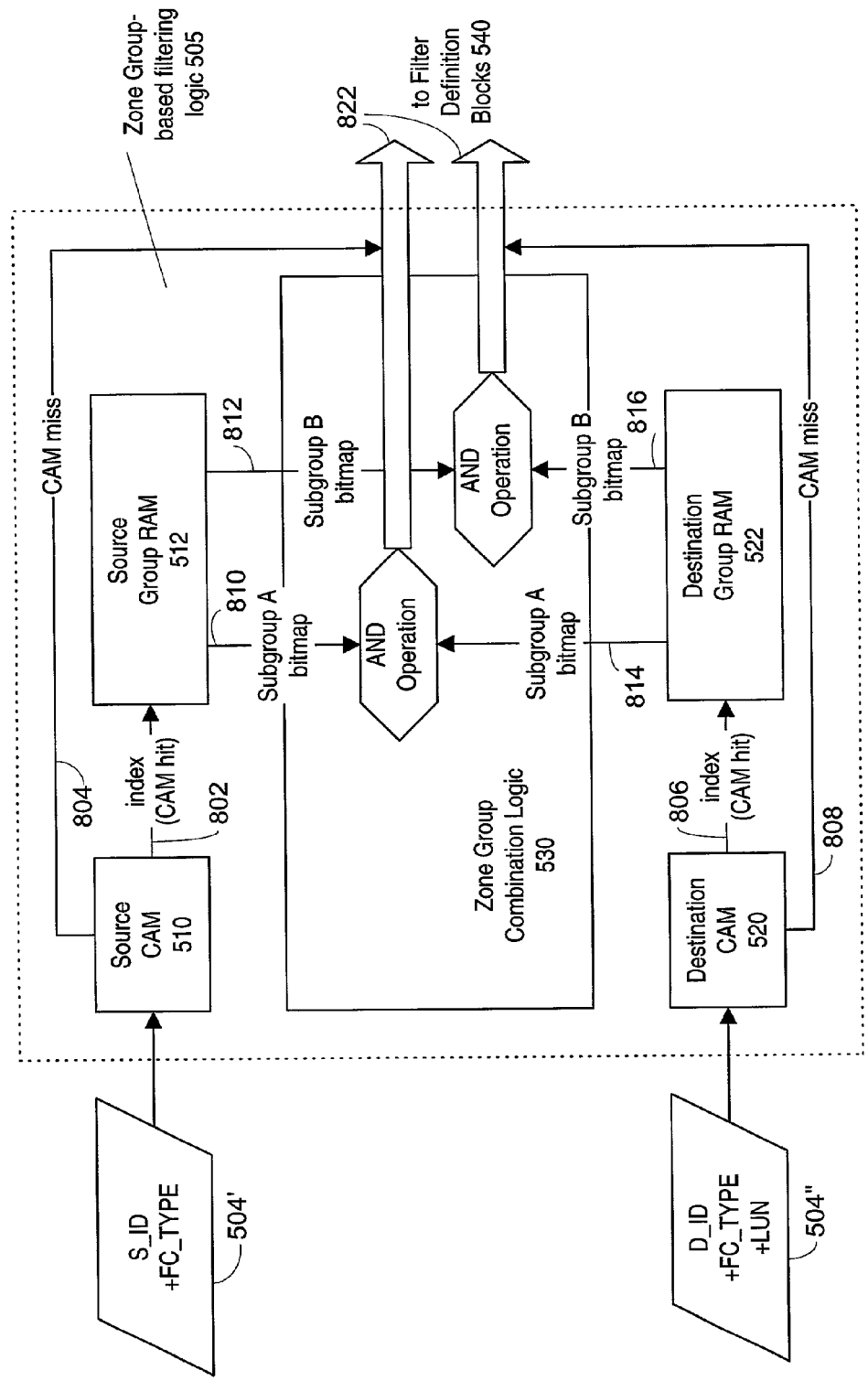
FIG. 8 illustrates a block diagram of the overall operation of the zone group based filtering logic of FIG. 5B.
Figure 9A:
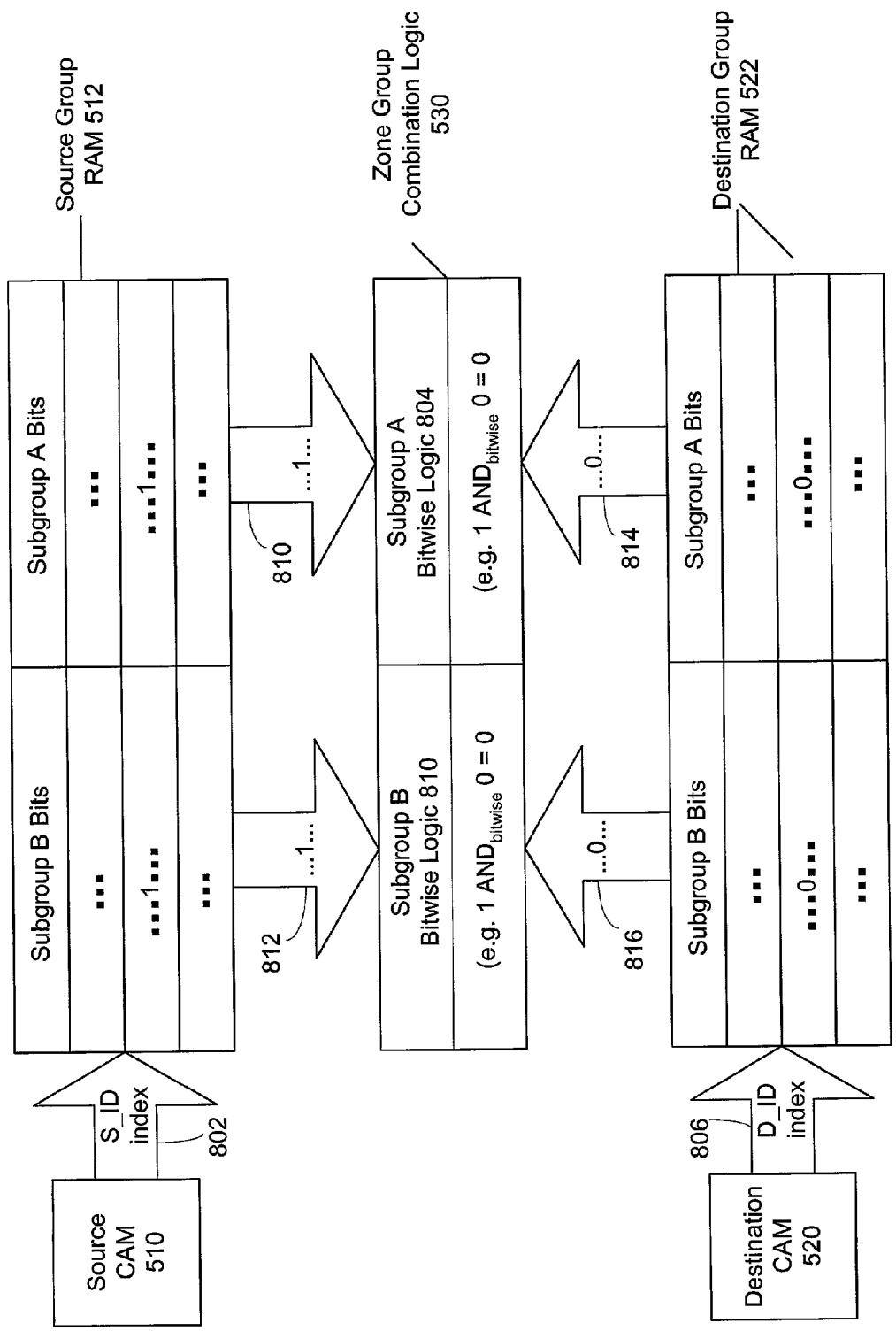
FIG. 9A illustrates a block diagram of one embodiment for implementing the zone group filtering logic of FIG. 8.

Still referring to the operation of the SCAM 510 and DCAM 520 shown in FIG. 6, a frame is read from central memory 504 into filtering logic 501 prior to being transmitted by the TX logic 570. Central memory 504 provides copied frame fields to the SCAM 510 and the DCAM 520. For SCAM 510, the S_ID and FC_TYPE fields from the frame header are captured as they are being read from central memory 504. The S_ID and the FC_TYPE are combined into the SCAM format and are compared with the predefined entries in the SCAM 510. A matching SCAM 510 entry results in an address being output, the address providing an index (802 as shown in FIGS. 8 and 9A) into the source group RAM 512. In a similar fashion, as the FC_TYPE, D_ID and LUN fields of the frame are read from central memory 504, they are captured for the DCAM 520. The actual LUN fields captured are based on the values present in a LUN offset register, which includes entries for FC_TYPE as well as multiple offsets to capture various portions of the packet to obtain LUN information. This flexibility of LUN value location identification allows customization for particular FC_TYPES and other variations in packets. In the preferred embodiment, a corresponding mask bit specifies if a byte should be ignored when performing a compare with a frame. There are four different offsets, which can be used to select any 4 bytes within the maximum offset of 2112 (though many of these bytes are not necessarily the LUN number). Certain bits in this register represent the FC_TYPE, which specifies that the LUN number will only be checked if the FC_TYPE matches. Otherwise, the LUN number will be ignored for other non-matching FC_TYPEs. A matching DCAM 520 entry results in an address being output, the address providing an index (806 as shown in FIGS. 8 and 9A) into the destination group RAM 522.

The source and destination group RAMs 512 and 522 (collectively referred to as the "zone group RAMs") both include two different zoning Subgroups A and B to facilitate different levels of access capabilities. For example, Subgroup zones may be used to permit different source devices to be zoned for either read access or write access to a particular LUN. A first set of source devices, belonging to groups defined by the Subgroup A bitmap, would be allowed read access to a given LUN. A second set of source devices (some of which may overlap with the first set of source devices) defined by the Subgroup B bitmap, would be allowed write access to a given LUN. Because the source and destination group RAMs 512, 522 are part of the zone group based filtering logic 501 which is quad-based, only two different Subgroups may be defined for a given set of four ports controlled by the quad-based filtering logic.

Figure 7:
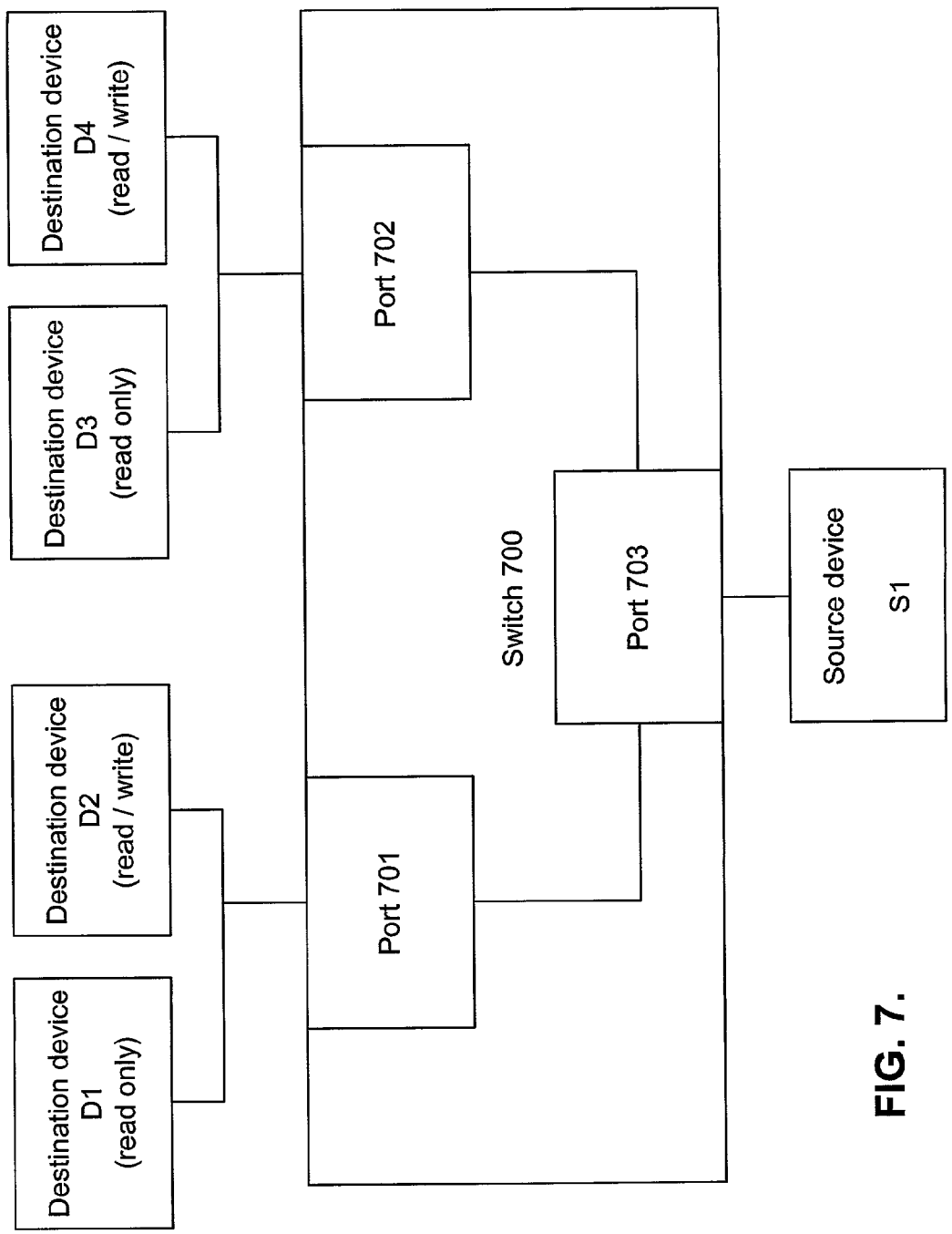
FIG. 7 illustrates a fabric switch with different devices zoned for different protocols in an embodiment of the present invention.

Each zone group has at minimum one S_ID, FC_TYPE pair and at minimum one D_ID, FC_TYPE, FCP_LUN set, some values of which may be wild cards. Whenever a new zone group is created, merging is performed within each Subgroup. This process is best explained by referring to an example. In the example, FIG. 7 illustrates a Fibre Channel system having a switch 700 including three ports 701, 702 and 703. Source device S1 is connected to port 703. Destination devices D1 and D2 are connected to port 701. Destination devices D3 and D4 are connected to port 702. Frame filtering is configured for switch 700 such that destination devices D1 and D3 may receive only read-only frames from source device S1, while destination devices D2 and D4 may receive both read and write access frames from source device SI. The source and destination devices are zoned in the following manner. Information regarding devices D1 and D3 is merged into Subgroup A, which is designated as being used for read-only access. Information regarding devices D2 and D4 is merged into Subgroup B, which is designated as being used for read/write access. It will be appreciated by one of ordinary skill in the art that various other types of access combinations may be assigned to the two zone group Subgroups. In addition, the two zone group Subgroups A, B may be designated to indicate other types of filtering information. In another embodiment, the two Subgroups may be combined to allow for a larger set of zone groups. It is noted that ports 701 and 702 are part of the same half-chip so that merging is implemented in a simple and cost-effective manner.

3. Further Details of the Zone Group Based Filtering Logic 501

FIG. 8 illustrates the operation of the zone group based filtering logic 501 in more detail. As frame fields S_ID and FC_TYPE, represented by 504', are transmitted from the central memory 504 to the filtering logic 501, the frame fields are compared with entries in the SCAM 510. A match (i.e., "source CAM hit" 802) provides an index into the source group RAM 512. If no match is found, a "source CAM miss" signal 804 is generated and sent to the filter definition blocks 540. Similarly, frame fields D_ID, FC_TYPE and LUN, represented by 504" are fed into filtering logic 501 from central memory 504, and are compared with entries in the DCAM 520, whereupon a destination CAM hit 806 or miss 808 are generated.

Figure 11A:
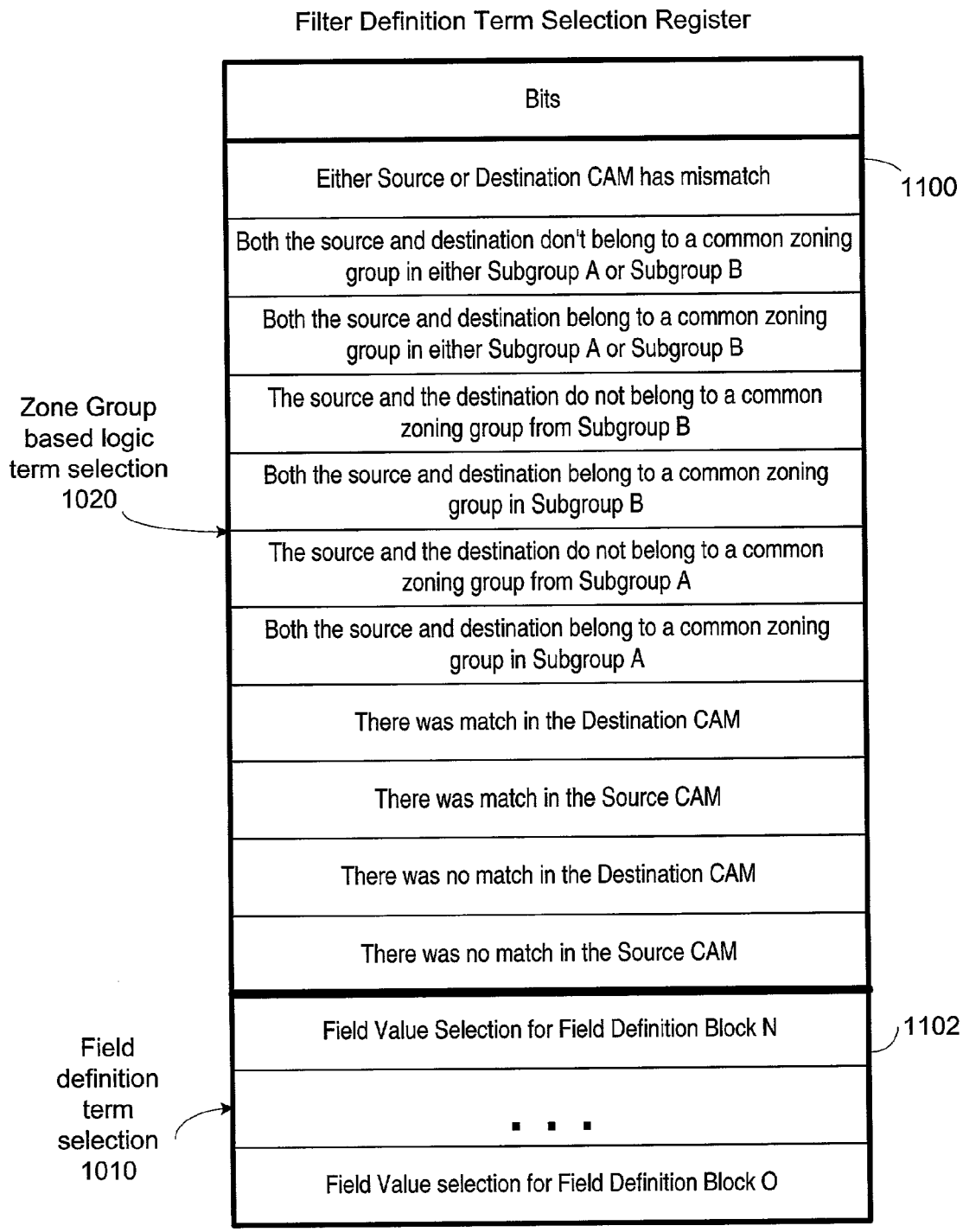
FIG. 11A is a diagram indicating one embodiment for implementing a filter definition term selection register in accordance with the present invention.

When the CAM indexes into the source group RAM 512 and the destination group RAM 522, each output bits corresponding to each Subgroup. The zone group combination logic 530 is used to examine the outputs 810, 812, 814, 816 from the source group RAM 512 and the destination group RAM 522, respectively, to calculate a large series of alternatives, including whether the source and destinations are or are not in a common zoning group. The preferred full list of alternatives is shown in FIG. 11A, described more fully below. The results of the calculation are forwarded to the filter definition blocks 540.

An example of the operation of the zone group combination logic 530 is illustrated in FIGS. 9A and 9B. The source group RAM 512 outputs bitmaps 810 for Subgroup A, and bitmaps 812 for Subgroup B. The destination group RAM 522 outputs bitmaps 814 for Subgroup A and bitmaps 816 for Subgroup B. The zone group combination logic 530 performs bitwise AND operations on the outputs for each Subgroup. For simplicity and without loss of generality, FIG. 9A shows a single bit for the bitmaps 810, 812, respectively, as being a 1 for Subgroup A and a 1 for Subgroup B. Similarly, only a single bit is shown for bitmaps 814, 816, respectively, as being a 0 for Subgroups A and a 0 for Subgroup B. In this example, for both Subgroups A and B, the result of 1 AND$_{bitwise}$ with 0 is 0; as a result, a bit is not set for either Subgroup, and there is no zoning group to which both the source and destination LUN device belongs. FIG. 9B is a logic diagram illustrating an embodiment for implementing the bitwise AND operations described in FIG. 9A. As shown in the embodiment, combination logic 530 can be implemented by the conventional AND and OR gates as will be familiar by those skilled in the art. It will become evident to those skilled in the art that the circuitry illustrated in FIG. 9B is provided for each Subgroup of the source and destination RAMs 512, 522, although not explicitly shown.

If there is no intersection (a zone group miss) between the source group RAM 512 and the destination group RAM 522, the firmware may have to update the zone bit map in both zone group RAMs. To maintain timing consistency, the RAMs 512, 522 should not be accessed while they are being updated. Preferably, frame transmission from the TX logic 570 and queue (FIFO 502) is disabled while the RAMs 512, 522 are being updated. Additional zone group information may be located in a virtual memory. As will be discussed in greater detail subsequently, a virtual memory can be used to overcome limited hardware resources. In particular, if a virtual memory is being used, additional zone group information may be swapped into the hardware structures when it is needed.

The output of the zone group based filtering logic 501 indicates the details of the CAM hits and misses, and whether there was a common zone group for the frame in question. This information is input to the Filter Definition Blocks 540A-D, along with the information from the Field Definition Blocks 550A-D.

4. Field Definition Blocks 550

In one embodiment previously mentioned, each field definition block 550 comprises a set of field control registers. The field definition blocks 550 define an offset and actual values to compare against frame values, which is defined generally to mean that the blocks 550 are used by the frame filtering logic to compare various fields in the frames being transmitted against a set of pre-specified values programmed into the set of field control registers by the firmware.

For example, certain bits of the field control registers define a byte offset into the frame of the field to be examined starting at the beginning of the frame header, other bits define different field values against which specified frame fields are to be compared and yet other bits define a mask representing which field values are to be used. As a frame is transmitted, the bytes in the transmitted frame at the offset specified in the field control register are copied into a holding register. The mask, if one is specified in field control register, is then applied to the contents of the holding register. The result of this computation is then compared against each of the field values specified in the field control register. Responsive thereto, a set of signals is produced for use by the corresponding filter definition block 540, indicating which, if any, of the field values matched the masked fields from the frame. The field control registers are shown in block diagram form in FIG. 1A.

Figure 10A:
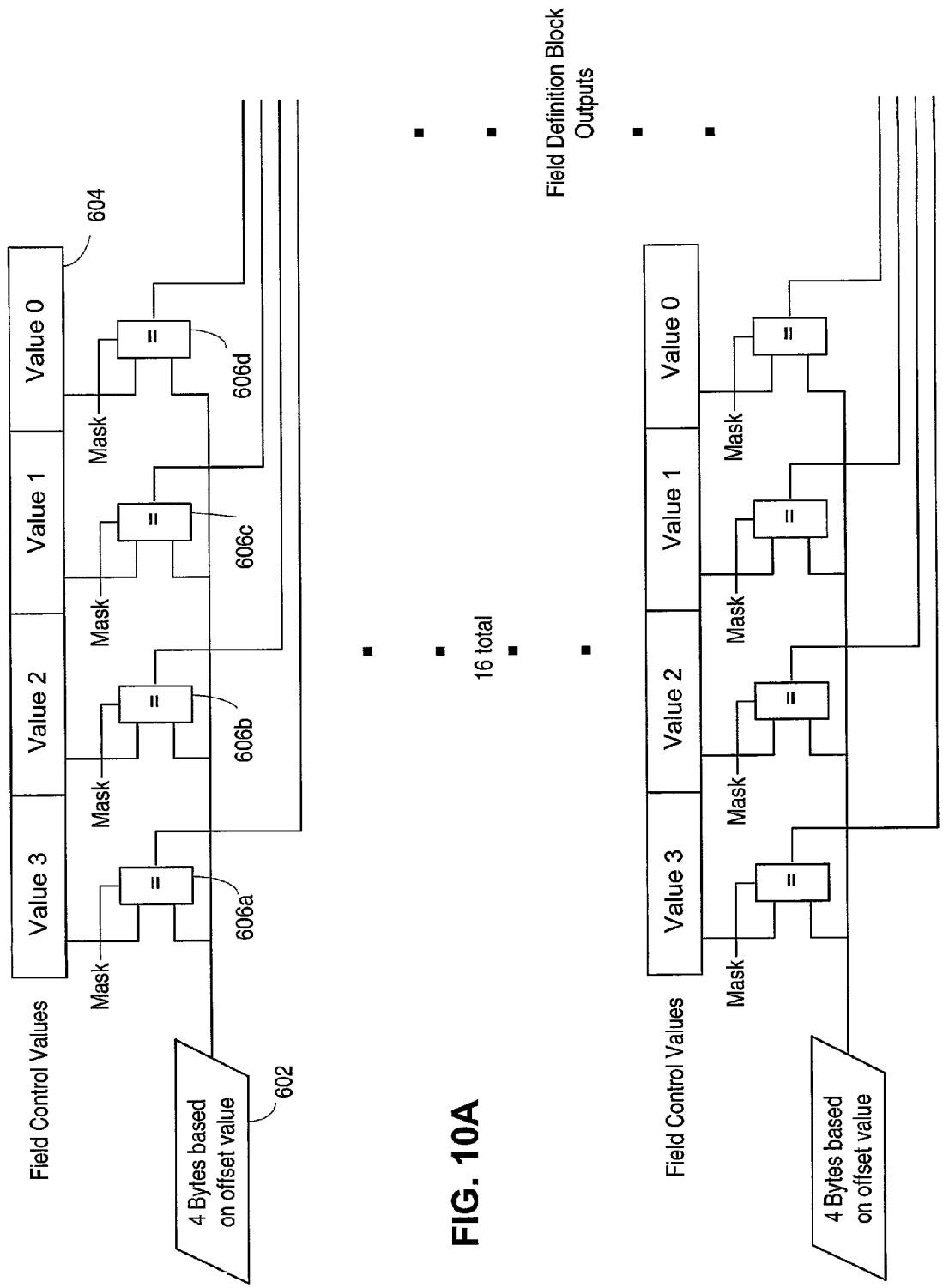
FIG. 10A is a block diagram of a field definition block of FIG. 5B.

In the preferred embodiment there are sixteen field control registers per port. A reduced number of these field control registers are shown in FIG. 10A. The preferred four bytes of frame data based on the defined offset value are contained in holding register 602. The four particular byte values are contained in register 604. The four byte values are compared to the four bytes in the holding register 602 by four comparators 606a-d. Additionally, the mask value for each value is shown logically as also being provided to the comparators 606a-d, where the comparator 606a-d provides a true or one output if masked. The comparator 606a-d outputs are the field value compare outputs provided to the respective filter definition block 540. The design of FIG. 10A is a logical representation of the operation of the field control registers, with actual implementations being readily developed.

One aspect of the present invention is the flexibility provided by the field control registers represented by blocks 550A-D. That is, in addition to the previously described filters which can be developed from the zone group logic 505, many different types of frame filters can be configured by using the field control registers alone or in combination. This can be more fully understood when the operation of the filter definition blocks 540A-D is explained.

5. Filter Definition Blocks

Figure 10C:
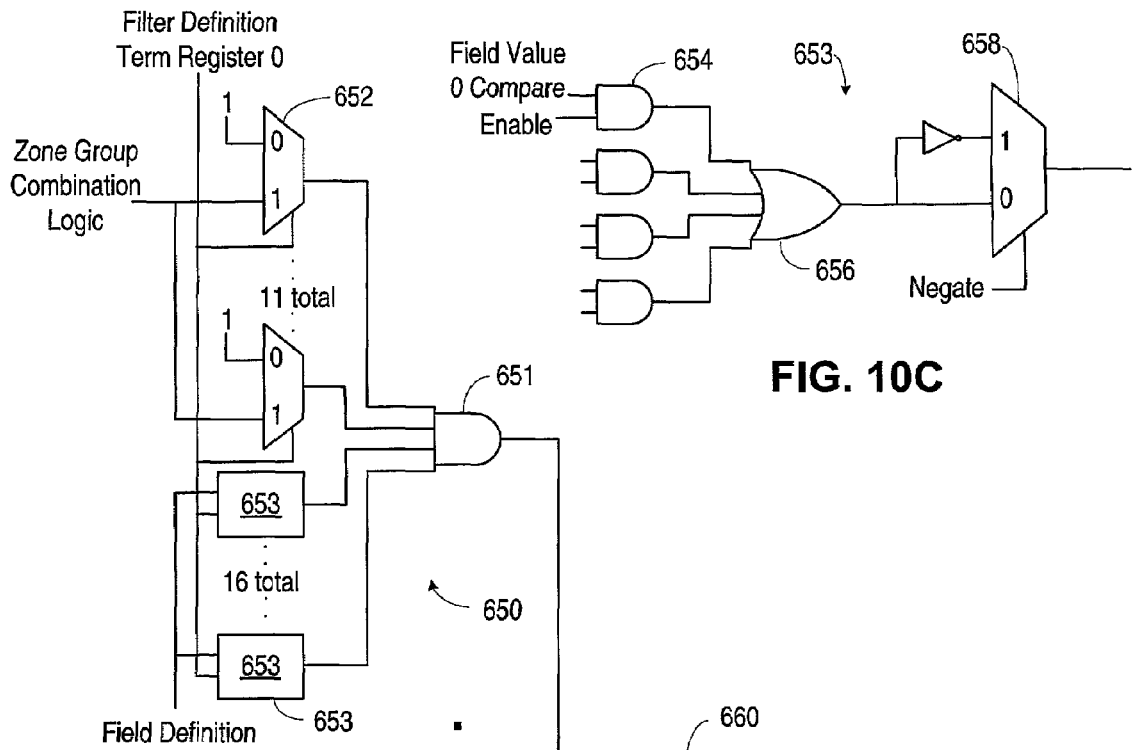
FIGS. 10B, 10C and 10D are block diagrams of a filter definition block of FIG. 5B.
Figure 10B:
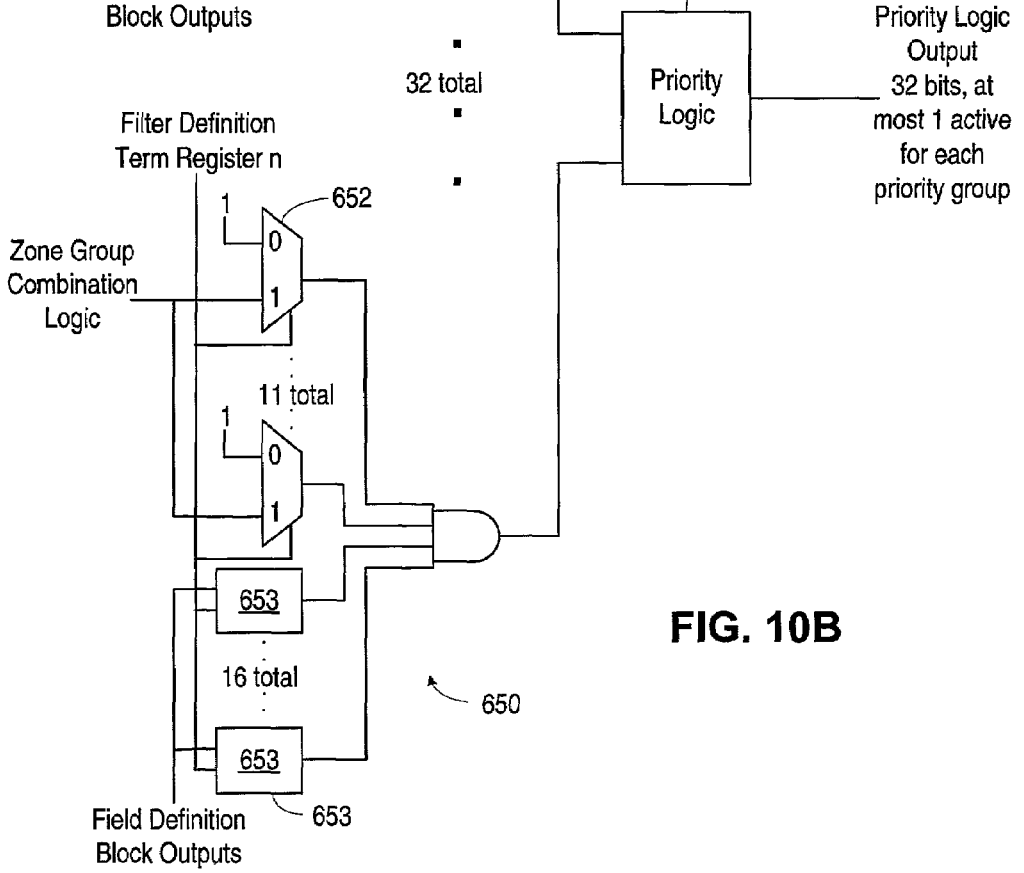

FIGS. 10B and 10C illustrate the operation of a filter definition block (e.g., 540A). The filter definition block 540A receives inputs from the field control registers, that is, from field definition block 550A, and from zone group based filtering logic 505. These inputs are supplied to a group of individual frame filters, preferably 32 per port in the preferred embodiment. An exemplary frame filter 650 is shown schematically for illustrative purposes. The frame filter 650 is broken down into two portions, one relating to the zone group logic 505 and one relating to the field definition block 550. For example, registers 1100, 1102 shown in FIG. 11A, respectively include a portion for zone group-based logic term selection 1020 and a portion for field definition terms selection 1010. As part of the provision of filter definition selection, group-based logic term selection 1020 comprises indicators representing, for example: (1) a CAM mismatch; (2) that both the source and destination belong to a common zoning group in Subgroup B; or (3) that there was a match in the DCAM. More examples are shown in the registers of FIG. 11A. It will be evident to one of skill in the art that a variety of different group based logic terms may be selected. The field definition term selection 1010 portion of the filter term selection register 1102 indicates which field control register values to consider. More than one field control register value may be linked together with an OR operation within each term. An example of the field definition term selection 1010 is shown in filter definition term selection register 1102 of FIG. 11A.

Referring back to FIGS. 10B and 10C, each individual frame filter 650 is a series of combinatorial logic whose outputs are combined by priority logic 660. Conceptually, there are eleven multiplexers 652 to correspond to the eleven combinations for the zone group term selections 1020. Conceptually, there are sixteen AND/OR gates 653 for the sixteen field definition selections 1010, though each of those AND/OR gates may include logic to negate the particular output.

In more detail, the zone group term multiplexer 652 receives the appropriate zone group combination logic output at the one input and has a logic true value at the zero input. The enable bit from the filter definition term register is used to select the input, with the output being connected to an AND gate 651 which combines all of the terms for the particular frame filter.

As an additional detailed example, the field value compare output for a particular field is provided as one input to an AND gate 654. The enable bit for that field value from the filter definition term register is the second input to the AND gate 654. Similar AND gates are provided for the other field values for that particular field definition block output. The outputs of the AND gate 654 and the other AND gates are the inputs to an OR gate 656. The non-inverted output of the OR gate 656 is provided to the zero input of a multiplexer 658, while the inverted output is provided to the one input. The input selection of the multiplexer 658 is provided by the NEGATE bit from the filter definition term register. The output of the multiplexer 658 goes to the AND gate 651. Thus, the individual field register values are ORed together, with that output potentially negated. If the NEGATE bit is true and each of the enable bits are zero, the output of the multiplexer 658 will always be true.

The outputs of the 32 frame filters for each port are then connected to priority logic 660 which provides outputs indicating which of the five frame filter outputs is the highest priority for each priority group. Thus the priority logic 660 effectively ORs each of the frame filter outputs for each group. There may be more than one true output from the priority logic 660, but only one true for each priority group. The priority grouping is preferably programmable.

Figure 10D:
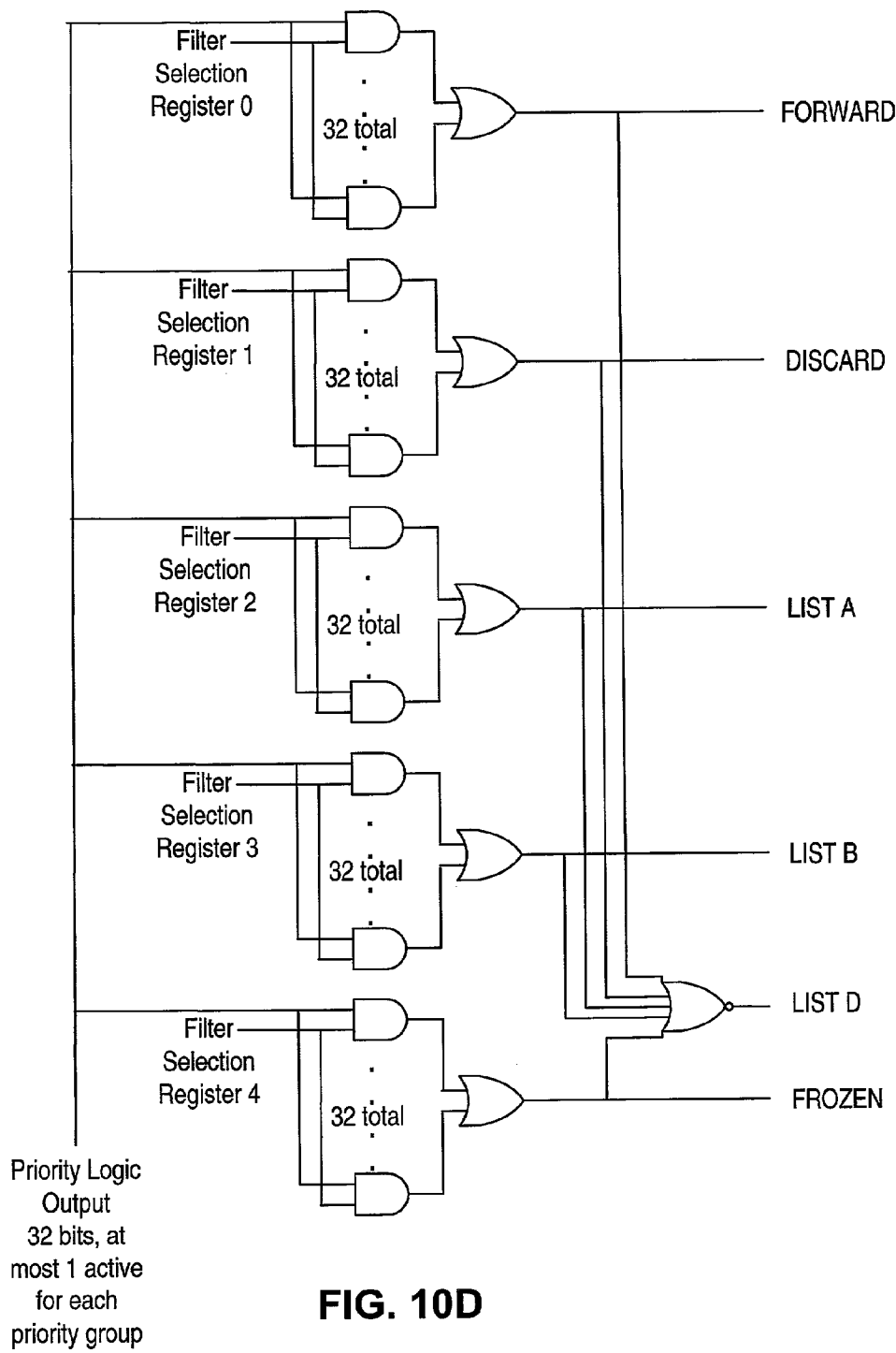

The outputs of the priority logic 660 are provided to logic as shown in FIG. 10D which selects the filter action for the particular frame. The filter actions in the preferred embodiment are 1) forwarding, when the frame is to be transmitted, 2) discard, when the frame can be discarded and four processor actions, namely 3) LIST A, 4) LIST B, 5) FROZEN and 6) LIST D. In the preferred embodiment there are filter selection registers corresponding to each of the frame actions, except LIST D. Each filter selection registers preferably contains 32 bits, one corresponding to each frame filter output. The filter selection register outputs are ANDed with the prioritized frame filter outputs for each frame action, as shown schematically in FIG. 10D with the outputs of the AND terms ORed together to produce a frame action signal. Thus, if any frame filter bit is true and the corresponding filter selection register bit is true, that frame action is selected. Preferably, the frame filter logic does not check for multiple frame actions for a particular frame filter output, that correlation being made by the firmware 190. If none of the frame actions are indicated by the AND/OR logic, a default action of LIST D is taken. In a FROZEN case, the packet is frozen or held so the firmware can fully analyze the packet to determine the proper response. The FROZEN case is also used when it is necessary to check the virtual frame filtering mechanism described below. LIST A, LIST B and LIST D frame actions are cases where processor intervention is required. The packet transmission is held until the switch processor can determine the proper response.

These action outputs are provided to the transmitter logic 570 and to the processor 202, depending on the action. The FORWARD and DISCARD action outputs are provided directly to the transmitter logic 570, which then either forwards or discards the frame, as appropriate. The other action outputs are provided to the processor 202 and the transmitter logic 570 essentially holds the frames until it receives an indication from the processor 202 on the disposition of the frame. Thus, forwarded and discarded actions are handled at full wire speed, with the other actions being potentially delayed because of processor handling times. This is not a performance issue in normal operation as the great majority of frames will be of the forward action, with only occasional frames requiring processor support.

6. Type of Actions for Frame Filters

Reference is now made in more detail to the various types of actions that may be taken on a frame as a result of frame filtering in accordance with the present invention. As discussed below, these types of actions include forwarding the frame, discarding the frame, rejecting a frame, further processing via lists, default action, and freezing the frame in order to invoke virtual zone group processing.

One type of action comprises "forwarding" a frame, which is defined to mean transmitting a frame to its destination device.

Another type of action comprises "discarding" the frame. More specifically, Class 3 frames are discarded, while Class 2 frames are sent to the processor 202 if the frame filtering action is specified to be discard/reject so that the appropriate Link Control response may be generated. In general, the "discard" action can be carried out in several different ways. For example, in one embodiment, the original EOF (end of frame) for a frame to be discarded is replaced with a bad EOF. The recipient port is then notified to dump this frame immediately upon receipt. In another embodiment, for example, the entire frame is read and dumped within the switch hardware 195, so as to avoid sending any bad frames.

Yet another type of action comprises actions specific to a particular port and categorized as List A and List B. Two separate lists are created for frames that are to be sent to the processor 202 for further handling. Thus, List A and List B may refer to different actions for different filter definition blocks. In general, List A and List B involve creating additional frame filters and forwarding frames to the processor 202 for further processing. For example, frames are forwarded to allow the processor 202 to modify the response to certain commands, or to further analyze various types of commands to determine if special operations need to be performed. Class 2 frames may also be sent to the processor 202 if the frame filtering action is specified as "discard" so that the appropriate Link Control response may be generated. List A and B processing are described in more detail subsequently in the List Processing section.

Another type of action comprises "freezing" the frame being transmitted. When a frame is frozen, it is prevented from leaving the port, typically to allow additional virtual zone group information to be accessed. As will be described in further detail subsequently, the "frozen" action is taken where it is necessary to access the "virtual" memory structures in the firmware. Virtual memory is used to store additional zone group information if no room is available in the physical hardware structures. All frames destined for the port will not be transmitted while virtual memory structures are accessed. The virtual memory is described in more detail subsequently.

A further type of action comprises the "no match" or "default" action, which is triggered if none of the other actions are invoked. The "default" action is the back-up action to undertake on a frame if no filter has matched. The frame should be forwarded to the embedded processor 420 for further processing. Preferably the default action is developed using the "List D" action.

7. Several Examples of Zoning with Frame Filtering

In accordance with the present invention, there are generally two types of filter definition selections: static filters and dynamic filters. Static filters are arranged from the bottom up (i.e., low priority) and dynamic filters are arranged from the top down (i.e., high priority). Static filters are pre-assigned with fixed usage. There may be up to 4 dynamic filters available for use. Filters not in use will be disabled, including unassigned filters, static filters that are not applicable, and dynamic filters not being used. In some cases, there may be no more filter definition resources left for a dynamic filter to use. In such cases, frames will be queued until resources become available to set up the necessary dynamic filters.

When SCSI LUN-level zoning is selected, individual frame filters can be created as a set of group based logic terms ANDed together with certain field selection terms. For example, these field select terms ("fields") can include R_CTL, D_ID, S_ID, FC_TYPE, FCP_LUN, and FCP_CMD, as shown in FIG. 11B.

Examples of individual frame filters used to enable various zoning groups may be stored in each filter definition selection register and are discussed as follows.

The Report LUN Data filter is a dynamic filter that enables LUN-level zoning. More specifically, this filter is designed to trap Report LUN Data/Response in order to allow the zoning kernel software to modify the frame information returned to the originator of the Report LUN Command. For example, a match of OX_ID, S_ID and D_ID identifiers can trigger this filter at the Fx_Port. Those LUNs not qualified in the zone of the originator device will be removed from the Report LUN Data payload. After the Report LUN Data has been modified, it will be forwarded to the originator of the Report LUN Command.

The PLOGI Accept filter is a dynamic filter that enables WWN zoning. This filter is designed to trap a PLOGI Accept frame to allow the zoning kernel software to verify whether the WWN in the payload and WWN of the destination device are in the same zone. Frames will be forwarded and appropriate zone groups will be set up if they are in the same zone. For example, the filter can be invoked when there is a match of OX_ID, S_ID and D_ID identifiers at the Fx_Port. If the frames are not in the same zone, frames will be marked with a bad status and the follow-up process will be continued at each port driver per Fibre Channel specifications. The frame is discarded for class 3 type of frames and an appropriate link control type of frame is sent out for class 2 type of frames.

The Report LUN Command filter is a static filter that can be implemented at the Fx_Port and E_Ports for enabling LUN-level zoning. The filter is designed to invoke a dynamic filter for trapping Report LUN Data/Response. For example, the R_CTL, FC_TYPE, and FCP_CMND fields can be checked to invoke a Report LUN Command. The Report LUN Command is forwarded once a dynamic filter has been set up. For example, this filter can be triggered when there is an S_ID, D_ID and zone group match at the F_Port and FL_Port. When an E_Port is used with this filter, the domain id of S_ID should be matched with the switch id so that no zone group match is needed. It is possible that there are no resources (Field Definition or Filter Definition) available for the dynamic filter set up. If no resources are currently available, the zoning firmware will wait until they are available. The Report LUN Command frame won't be forwarded until the dynamic filter set up is complete.

The PLOGI Request filter is a static filter that enables WWN zoning, and is designed to set up a dynamic filter to trap a PLOGI Accept frame at either the Fx_Port or E_Port. The PLOGI Request will be forwarded once the dynamic filter has been set up. For example, this filter can be triggered with the R_CTL and FC_TYPE indicating an ELS, and a Command code indicating a PLOGI for the Fx_Port. When the E_Port is used, the domain id of S_ID can be matched with the switch id. It is possible that there are no resources (Field Definition or Filter Definition) available for dynamic filter set up. If no resources are currently available, the zoning kernel software will wait until they are available. The PLOGI Request frame will not be forwarded until the dynamic filter set up is complete. For Fx_Port, this filter allows the zoning software to verify whether the WWN in the payload and WWN of the destination device are in the same zone. Frames are forwarded and appropriate zone groups are set up if they are in the same zone. A PLOGI accept trap can also be set up if the source and destination devices between the logins are in the same switch. If they are not in the same zone, frames are marked with a "bad" status and the follow-up process is continued at each port driver per Fibre Channel specifications. The frame is discarded for class 3 type of frames and the appropriate link control type of frame is sent out for class 2 type of frames.

Virtual vs. Real Hardware for Filter Storage

Even if significant frame filtering resources are provided by the switch hardware, there may still be limitations with critical resources. Typical resources that may become space-limited include the DCAM, SCAM, zone group RAM and field definition control registers. The frame filtering system in accordance with the present invention will now be discussed with focus on overcoming the "real" hardware limitations through the concept of virtual DCAM, virtual SCAM and virtual zone group RAM. It is noted that the embodiment for the quad-based frame filtering discussed below is purely illustrative, and that one of ordinary skill in the art will recognize that the concept of providing virtual capacity is well-suited to other embodiments of switches.

A. Frame Filtering with Virtual Hardware

DCAM, SCAM and zone group RAM are critical but may have limited resources. For example, an embodiment in accordance with the present invention having 64 SCAM entries, 512 DCAM entries and 128 zone groups shared across 4 ports of a half-chip, could pose significant limitations for potential frame filtering applications. In order to expand the resources of the half-chip hardware in this example, the concept of virtual DCAM, SCAM and zone group RAM is introduced to expand the physical DCAM, SCAM and zone group RAM built-in "real" hardware.

Upon triggering the "frozen" filtering action previously discussed, the present invention provides a connection between the virtual hardware and the real hardware. Generally, the virtual hardware should be larger than the real hardware. Since the capacity of the real hardware is less than the capacity of the virtual hardware, only a portion of the virtual entries should be loaded into the real hardware. When a filter "frozen" action is undertaken, the present invention will freeze the transmit port, interrupt the CPU and provide the frame with frozen status, so as to allow the firmware to process the virtual hardware information and clear up the frozen condition. In this example, the filter associated with the action ("frozen") can be triggered upon a SCAM, DCAM or zone group miss. Once a frame is frozen and service is interrupted, the process will swap SCAM, DCAM and zone group entries between virtual hardware and real hardware. After new entries are loaded into the real hardware, frame filtering actions continue as normal until another frozen action gets triggered.

Figure 17:
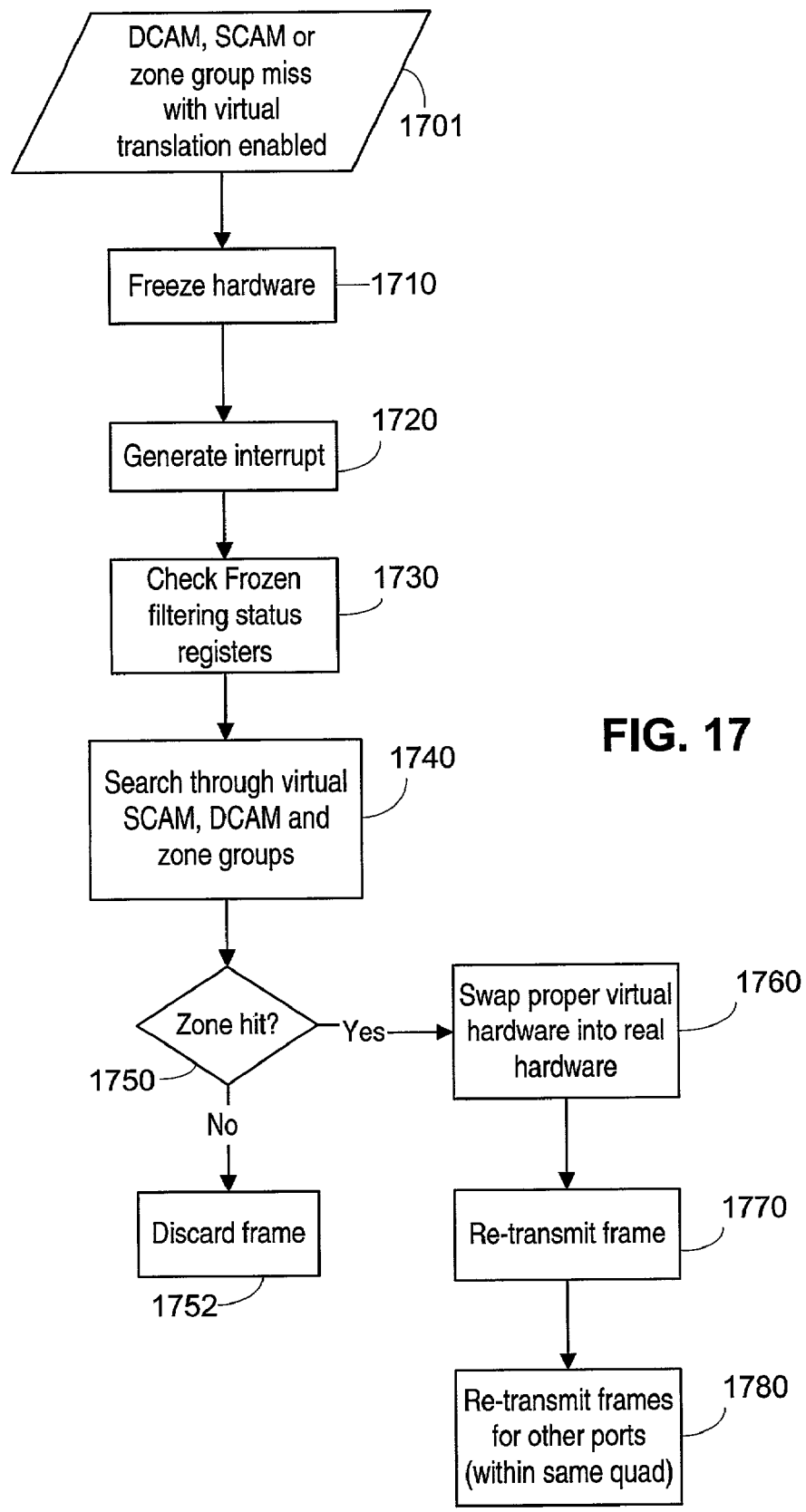
FIG. 17 is a flowchart illustrating one method for processing a frozen filter action in accordance with the present invention.

The "frozen" filtering action provides a bridge for connections between the virtual hardware and the real hardware. FIG. 17 illustrates the procedure for processing a frozen filtering action. The frozen action is triggered when a DCAM, SCAM, or zone group miss occurs when virtual translation is enabled 1701. The switch hardware will be frozen 1710 and an interrupt will be generated 1720, thereby freezing the frame for a particular port within the switch and interrupting the transmission process. The frozen interrupt handler checks the Frozen Filtering Status registers 1730. The frozen interrupt handler then searches 1740 through virtual SCAM, DCAM and zone groups to determine 1750 if there is zone hit within the virtual structures. If there is no zone group hit associated with the frozen frame, the filtering hardware is programmed to discard the frame 1752. In another embodiment, a different action may be programmed if there is no zone group hit.

If there is a zone hit (based on the search result), virtual hardware entries will be swapped into the real hardware 1760. The frame is then re-transmitted 1770, allowing it to be properly processed by the newly installed real hardware structures. If DCAM, SCAM or zone group entries were swapped and there are other ports (within the same quad) that are still frozen, the other frames within these ports are also re-transmitted 1780.

Thus, the capacities of the real DCAM, SCAM and zone group RAM can be expanded via the virtual hardware. In accordance with one embodiment of the present invention, the swapping of entries between virtual hardware and real hardware is implemented within the driver at the hardware level 195 without the need for an intermediate upper layer software ("midware") 185 being involved. The midware 185 should recognize that more zone groups can be configured.

The swapping of entries between virtual hardware and real hardware not only increases the latency of frame delivery but also requires significant CPU bandwidth. Significant performance degradation is possible if this swapping activity happens consistently. For example, consistent swapping activity could occur if concurrent traffic occurs across multiple zones, beyond the capacity of the real hardware. Thus, the desire for creating additional zone groups requiring virtual storage should be balanced against the need for low-latency frame delivery.

This aspect of the present invention concerning virtual hardware is beneficial in the situation where the resources of the field definition block 550 may become limited. For example, the field definition control capacity can be expanded with virtual hardware.

B. Mapping the Virtual Hardware to the Real Hardware

According to one embodiment of the present invention, the virtual SCAM, DCAM and zone group RAM memory structures are implemented through system memory at the firmware level 190. In this embodiment, all the zone group manipulations are exercised through the system memory first before being actually applied to the real hardware. That is, memory should be updated before updating the hardware. One reason for doing so is to alleviate traffic on the PCI bus to the Fibre Channel circuits.

Typical manipulations of zone groups include: (1) add or remove a SCAM entry; (2) add or remove a DCAM entry; and (3) add, remove, merge, or split zone groups. Once these manipulations are exercised in the system memory, the updated entries are applied to the real hardware as needed. Not all of the changes in the virtual hardware should be updated into the real hardware since the real hardware typically has less capacity than the virtual hardware. Only those entries that are currently mapped into the real hardware need to be updated. A mapping operation enables entries from the virtual hardware to be applied to the real hardware, and to ensure that virtual entries are loaded into the proper real entries. This mapping operation is undertaken when swapping entries between the virtual hardware and real hardware.

One manner of implementing the mapping operation is through virtual translation. Virtual translation can be enabled individually for SCAM 510, DCAM 520, Subgroup A of the zone group RAMs 512, 522, Subgroup B of the zone group RAMs 512, 522, or a combination of some or all of these structures. In the situation where a large block of memory (e.g., approximately 1 MB) is reserved for virtual DCAM, SCAM and zone group RAM at initialization, the usage of this pre-allocated memory will be expanded as needed. The expanded usage may be needed for implementing virtual SCAM, DCAM, zone group RAM or a combination of some or all of them. Even if the number of zone groups is the same across real Subgroup A and Subgroup B, when access control is enabled, virtual Subgroup A and Subgroup B may be different in size.

The aspect in accordance with the present invention pertaining to virtual hardware is applicable even if the upper layer software does not need additional virtual capacity other than what real hardware provides. In one embodiment in accordance with the present invention, the mapping between virtual hardware and real hardware can be simplified to a one-to-one correspondence in order to avoid carrying unnecessary overhead in situations where the additional virtual capacity is unnecessary. In another embodiment, the virtual SCAM and DCAM may be implemented through additional real SCAM 510 and DCAM 522 instead of through system memory, when both virtual and real SCAMs and DCAMs are exactly the same capacity. Both SCAMs and DCAMs can be mapped as system memory so as to trim the system overhead because there is no need to apply the virtual SCAM and DCAM to real SCAM 510 and DCAM 522.

C. An Implementation of Data Structures for Virtual Hardware

One embodiment of data structures that are well-suited for use with quad-based frame filter hardware management in accordance with the present invention will now be discussed. In the embodiment, reference is made to a virtual zone group, a virtual SCAM, a virtual DCAM, a real zone group, a real SCAM and a real DCAM. It is noted that in the situation where the management of virtual SCAM and virtual DCAM is almost identical, it is preferable to use the same process to manage data structures corresponding thereto. Those of ordinary skill in the art will appreciate that in addition to the described embodiment, many other different types of data structures may be used in the present invention, and that the data structures described herein are purely illustrative.

In accordance with the present embodiment, a virtual zone group comprises data structures to enable the following functionality: a virtual zone group RAM; a virtual zone group dirty flag; a free virtual zone group pool; and a virtual zone group in use flag. The virtual zone group RAM memory is allocated for virtual zone group manipulation. Manipulations of the virtual zone group are performed on this RAM memory first before being applied to the real zone group hardware show in FIG. 5B. The dirty flag is associated with each virtual zone group entry as an indication of zone group "changed" status. For example, a dirty flag value of "1" can be defined to mean that the zone group has been updated. Virtual zone group entries marked changed may have to be applied to the real zone group RAM. The dirty flag will be referenced when applying the virtual zone group to the real zone group for zone group updates. All virtual zone group entries not used can be kept in a free group pool. With each virtual zone group entry, another flag can be used to indicate if a particular virtual zone group is in use or not.

In order to implement the virtual SCAM, data structures can be designed to perform the following functions: virtual SCAM RAM; virtual SCAM dirty flag; free virtual SCAM pool; virtual SCAM sorted indexed array; virtual SCAM aging list; and virtual SCAM in use flag. A virtual SCAM RAM is implemented through system memory (i.e., central memory). Each virtual SCAM entry has a dirty flag associated with it as an indication of SCAM "changed" status. For example, a dirty flag value of "1" means the virtual SCAM has been updated. Virtual SCAM entries marked changed may have to be applied to the real SCAM. Virtual SCAM entries not currently in use are kept in the free pool. An aging process is used to invalidate outdated virtual SCAM entries, and can be implemented with a linked list. With each virtual SCAM entry, a flag can be used to indicate if a particular virtual SCAM is in use or not. The virtual SCAM sorted index array data structure comprises an array of indexes, which point to SCAM entries. The order of these indexes is sorted by the content of the SCAM entry. The array is beneficial for speeding up the processing of a frozen interrupt at SCAM miss.

To implement a virtual DCAM, data structures can be used to perform the following functions: virtual DCAM RAM; virtual DCAM dirty flag; free virtual DCAM pool; virtual DCAM sorted indexed array; virtual DCAM aging list; and virtual SCAM in use flag. A virtual DCAM RAM is implemented through system memory, similar to the virtual SCAM RAM. Each virtual DCAM entry has a dirty flag associated with it as an indication of DCAM "changed" status. For example, a dirty flag value of "1" means the virtual DCAM has been updated. Virtual DCAM entries marked changed may have to be applied to the real DCAM. A virtual DCAM sorted index array data structure can be implemented in a similar fashion to the virtual SCAM sorted index array so as to improve upon the processing time for a frozen interrupt when a DCAM miss occurs. In doing so, the data structure comprises an array of indexes which are pointing to the DCAM entries. The order of the indexes may be sorted by content of DCAM entry. Virtual DCAM entries not currently in use are kept in the free pool, which may be implemented as a linked list. An aging process is used to invalidate outdated virtual DCAM entries, and can be implemented with a linked list. With each virtual DCAM entry, a flag can be used to indicate if a particular virtual DCAM is in use or not.

The data structures for real zone group management are activated when the capacity of the virtual hardware is larger than the real hardware, thereby necessitating the swapping of virtual and real zone group information. For example, real zone group entries not currently in use should be kept in a free pool, which may be implemented as a linked list. Each real zone group entry contains an index to an associated virtual zone group. The index indicates which specific virtual zone group entry is currently holding the real zone group entry.

The data structures for real SCAM management are activated when the capacity of the virtual hardware is larger than that of the real hardware. For example, data structures can be implemented for performing the following functionality: free real SCAM pool; index to virtual SCAM; and retiring real SCAM list. In this example, the real SCAM entries not currently in use can be kept in a free pool. Each real SCAM entry includes an index pointing to a virtual SCAM entry. The index indicates which specific virtual SCAM entry is currently holding this real SCAM entry. After implementing the frozen action upon a SCAM miss, a SCAM entry may be swapped out of a real SCAM entry to leave room for a new virtual SCAM entry. Known round robin techniques can be implemented with head and tail pointers for maintaining a list of the retiring real SCAM entries.

The data structures for real DCAM management should be activated when the capacity of the virtual hardware is bigger than that of the real hardware. The data structures for real DCAM management can be implemented in a similar manner as discussed with the real SCAM management.

D. Operations of Transport and Mapping Between the Virtual and Real Hardware

In accordance with the described embodiment, several operations are performed to facilitate the transport between the virtual hardware and the real hardware. For example, one operation applies all virtual hardware (e.g., SCAM, DCAM and zone group entries) marked with the "dirty" indication to the real hardware. Another operation applies the specific virtual SCAM, DCAM and zone group entries to the specific real SCAM, DCAM and zone group entries. In yet another operation, a specific virtual SCAM entry is applied to a specific real SCAM entry, and all real zone groups associated with the real SCAM are correspondingly updated in response thereto. This operation can be implemented similarly with the virtual and real DCAMs. Additionally, a operation can be included to apply the specific zone group entry to a specific real zone group entry.

Other operations that can be implemented in accordance with the present invention include those operations which map the virtual to the real hardware. In general, two sets of mapping functions can be performed to map between the virtual and the real hardware. A first set of mapping functions is referenced when the capacity of the virtual hardware is the same as that of the real hardware. This first set of mapping operations is relatively straightforward, since there is a one-to-one relationship between the virtual hardware and the real hardware. Virtual translation is disabled with this case. A second set of mapping functions is referenced when the capacity of the virtual hardware is larger than that of the real hardware. This second set of mapping functions requires additional translation to map virtual hardware to the real hardware. Virtual translation is enabled with this case.

For example, the following mapping operations may be performed: mapping virtual SCAM to real SCAM; mapping virtual DCAM to real DCAM; mapping virtual zone group to real zone group; mapping real SCAM to virtual SCAM; mapping real DCAM to virtual DCAM; and mapping real zone group to virtual zone group. For each of these mapping operations, there are generally two functions implemented, depending on whether virtual translation is enabled or not. When virtual translation is enabled, the virtual hardware may not be loaded into the real hardware yet, and thus mapping will be failed given this condition. A new entry is made available through allocation or retiring in order to map (i.e., load) new virtual hardware into real hardware.

Virtual entries are mapped to corresponding real entries in the following manner. If virtual translation is not enabled, the index to the virtual SCAM is the index to the real SCAM. If virtual translation is enabled, a search (sequential) for a SCAM entry must be accomplished in order to locate the particular real SCAM entry. Similarly, if virtual translation is not enabled, the index to the virtual DCAM is the index to the real DCAM. If virtual translation is enabled, a search (sequential) for a DCAM entry must be accomplished in order to locate the particular real DCAM entry. Additionally, if virtual translation is not enabled, the index to the virtual zone group is the index to the real zone group. If virtual translation is enabled, a search (sequential) for a zone group entry must be accomplished in order to locate the particular real zone group entry.

By comparison, real entries are mapped to virtual entries in the following manner. If virtual translation is enabled, a mapping operation will be used to reference the real hardware entries to the virtual entries. The real SCAM is mapped to the virtual SCAM through reference to the virtual SCAM index array. The real DCAM is mapped to the virtual DCAM through reference to the virtual DCAM index array. The real zone group is mapped to the virtual zone group through reference to the virtual zone group index array.

E. Virtual Hardware Management

Virtual zone group management is split into Subgroup A and Subgroup B, whether or not access control is enabled. For ports with access control enabled, the virtual zone groups used are allocated from the proper Subgroup. For ports without access control, the zone groups can be used from either Subgroup.

A variety of operations are performed on the virtual SCAM, DCAM and zone group structures. For example, the data structure of each of these virtual structures are initialized. Additionally, each of these virtual structures can be allocated and returned to a free pool. For the virtual SCAM and DCAM, such entries can be inserted into a sorted index array for referencing therefrom. Through a binary search, the virtual SCAM and DCAM entries may be located with the index array. The virtual SCAM and DCAM entries can also be added to a list for aging the entries, and located and removed as needed from the aging list. As discussed previously, a determination may be made whether two virtual zone group entries can be merged through the same SCAM or DCAM entry. Likewise, the operations for actually merging the two zone group entries based on the SCAM or DCAM entry are also provided. Furthermore, the operation of merging all virtual zone groups is provided, as is the operation of adding a new virtual zone group and correspondingly arranging the virtual resources to accommodate the added virtual zone group. Even further, SCAM, DCAM and zone group entries may be: expanded when the virtual hardware resources reach full capacity; removed; and split so as to preserve the integrity of the virtual resources. It will be evident to one of ordinary skill in the art that a variety of other operations may be performed upon the virtual structures during the management of frame filtering operations.

F. Real Hardware Management

Real hardware management operations are referenced only when the capacity of the virtual hardware is larger than that of the real hardware, e.g. virtual translation is enabled. Real zone group management is split into Subgroup A and Subgroup B, whether or not access control is enabled. For ports with access control enabled, real zone groups used are allocated from the proper Subgroup. For ports without access control, zone groups can be used from either Subgroup.

A variety of operations are performed on the real SCAM, DCAM and zone group structures, similar to that described previously with regard to the virtual structures. For example, the real SCAM, DCAM and zone group structures can be: initialized; and allocated from and returned to a free pool as needed. The same real structure entries may also located and retired. Also, each of the virtual SCAM, DCAM and zone group entries can be located in the respective real SCAM, DCAM and zone group hardware, if preexisting. It will be evident to one of ordinary skill in the art that a variety of other operations may be performed upon the real structures during the management of frame filtering operations.

Per Port Based Frame Filtering Hardware Management

Additional data structures and operations are provided in accordance with the present invention to manage those dedicated field definition control and filter definition selection hardware of each port-based logic structure. For example, in the described embodiment of FIG. 5B, each port had 16 field definition registers, each of which defined one offset into a frame to be transmitted and several possible values (e.g., four) for comparison operations. Each field definition register can be referenced by one or more filter definition selection registers as a qualification for the triggering of a filter. Both field definition and filter definition resources are critical and limited resources.

A. Field Definition Control and Resource Allocation

In the described embodiments, each of the field definition registers defined can be referenced by one or more filter definition selections. With field definition registers, frame filters can be based on FC_TYPE, FCP_CMD, D_ID, S_ID, Exchange_ID and R_CTL fields.

It is noted that the FC_TYPE, FCP_CMD, and R_CTL fields are generally static fields. In order to trap PLOGI for WWN-level zoning and the Report LUN command for LUN-level zoning, the field definition registers should be used to set up dynamic filters based on S_ID, D_ID and OX_ID.

B. Field Definition Control Management and Data Structures

The field definition control is a limited and shared resource, which requires management. Accordingly, for each field definition block 550, references from the filter definition blocks 540 are preferably tracked. In the described embodiments, there may be up to four values associated with each field, and all references to these values provided during filter definition selection can be tracked independently so that resources may be freed at the value level. For example, an individual value can be freed even if its associated field definition is still referenced with other values. A word (e.g., four bytes) is allocated for each field definition, and each byte represents a reference to a value of a field definition block 550 from a filter definition block 540. In this example, a byte count of zero is defined to mean the associated value is free for use. When the whole word (i.e., all four bytes) is zero, the associated field definition control is available for use.

When field and filter definition control becomes limited, requests for service should be queued until resources are available. All frames trapped by the zoning driver and waiting for resources (i.e., field definition control or filter definition selection) are kept in a queue until appropriate resources are available.

C. Field Definition Operations

In accordance with the present invention, there are a number of field definition operations that are enabled. A first operation will initialize the data structures required for the field definition control. Another operation will locate the field definition control and value position with specific offset and value. For example, this operation determines whether a specific offset, mask and value exist in a field definition control. The operation allocates the field definition control and associated value, if necessary. An index to the field definition and position for a value can be returned for reference; and if either of these are unavailable, then a status indication should be returned to queue the request for lack of resource space. It is preferable that both resource be allocated, or none at all.

An operation in the nature of updating the field definition control with a specific value is provided, as is an operation to release the field definition control being associated with a specific index and value position.

D. Filter Definition Selection and Usage Thereof

In one embodiment of the present invention, there are a predetermined number (e.g., 32) of filter definition selections (each representing an individual frame filter combination of terms) available to each port. Generally, filter definition selections are indexed by number, for example, with zero representing the highest priority filter and 31 the lowest priority filter. The application of filter definition for zoning is arranged carefully because the priority of each filter definition selection can be relevant since, depending upon zone type setup for the port, selected filters may be setup for the port. For those filters not installed, they should be disabled. The application of each filter is pre-assigned at compile time, and these pre-assigned filters may be disabled or enabled depending on zone type configuration.

Reference is now made to the following list of filter definition selections. These individual frame filters include the following, which have been previously discussed: Report LUN Data; PLOGI Accept; Report LUN Command; PLOGI Request. Further filter definition selections include: (1) DCAM, SCAM and zone group match; (2) Extended Link Service and Basic Link Service; (3) DCAM miss and SCAM match; (4) SCAM miss and DCAM match; (5) either DCAM or SCAM miss; (6) Zone group miss; (7) Discarding All Frames; (8) Forwarding All Frames; (9) Access Control—Subgroup B with Write; and, (10) Access Control Subgroup B with any command.

A static filter which allows traffic in a zone can be triggered by a SCAM, DCAM and zone group match at the Fx_Ports. This filter is preferably a default filter, designed to forward all frames with a zone group hit. The filter is preferably always installed if filtering is enabled through zoning.

Another static filter can be designed to capture all ELS (Extended Link Services) and BLS (Basic Link Services) frames when a protocol wildcard is not enabled. The purpose of this filter is to allow the software to make a decision regarding frame actions according to List A, and is triggered by TYPE (e.g., 0x00or 0x01) as ELS or BLS on the Fx_Port. Without the protocol wildcard, a specific FC_TYPE is indicated with each DCAM and SCAM entry. In order to save DCAM and SCAM resources, FC_TYPE for ELS and BLS are not loaded into DCAM or SCAM entries. Thus, frame filtering will have a zone group miss for ELS and BLS frames due to FC_TYPE. ELS and BLS frames are forwarded or discarded through a software decision process. However, if the protocol wildcard is enabled, the ELS and BLS frames will be forwarded if they have a zone group hit by a higher priority filter, since no FC_TYPE will be checked. For frames that have a zone group miss, one of the lower priority filters should discard them. It is preferable that this filter not be installed if the protocol wildcard is enabled, because with the protocol wildcard enabled, frames with a zone group miss should be discarded immediately without software involvement.

Yet another static filter can be used to swap SCAM, DCAM and/or zone group entries as needed, so that virtual translation is enabled for DCAM, but not SCAM. This filter is triggered by a DCAM miss on the Fx_Port. When the virtual DCAM is implemented, a frozen action results, so that DCAM, SCAM and zone group entries can be swapped between the virtual hardware and the real hardware. Once appropriate entries have been swapped in, frames can be re-transmitted and qualified by filtering again. Retransmitted frames should be processed by other filters with higher priority, since there should be a SCAM, DCAM and zone group (either Subgroup A or Subgroup B) hit (e.g. the same frame should not be hit with this filter again). Should a real DCAM, SCAM or zone group miss occur, the frames are discarded immediately without retransmission.

Conversely, another filter can be provided at the Fx_Port to swap DCAM, SCAM or zone group entries as needed when a SCAM miss and DCAM match occur. This static filter implements a virtual SCAM so that a frozen action results, thereby enabling DCAM, SCAM and zone group entries to be swapped between the virtual hardware and the real hardware. Once appropriate entries have been swapped in, frames are retransmitted and qualified by filtering again. Re-transmitted frames are processed by other filters with higher priority, since there should be a SCAM, DCAM and zone group (either Subgroup A or Subgroup B) hit (e.g. the same frame should not be hit with this filter again). Should a real DCAM, SCAM or zone group miss occur, the frames should be discarded immediately without retransmission.

When there is either a DCAM or SCAM miss, a static filter can be enabled on the Fx_Port to swap SCAM, DCAM and zone group entries as needed. This filter enables virtual translation for both SCAM and DCAM, so that a frozen action results, thereby allowing DCAM, SCAM and zone group entries to be swapped between the virtual hardware and the real hardware. Once appropriate entries have been swapped in, frames are re-transmitted and qualified by filtering again. Re-transmitted frames should be processed by other filters with higher priority, since there should be a SCAM, DCAM and zone group (either Subgroup A or Subgroup B) hit (e.g. the same frame should not be hit with this filter again). Should a real DCAM, SCAM or zone group miss occur, the frames should be discarded immediately without re-transmission.

A static filter can be provided for a zone group miss from the Fx_Port, and can be designed to implement a virtual zone group, that is, either virtual Subgroup A or virtual Subgroup B. A frozen action results when there is a miss as to both Subgroup A and Subgroup B. This enables virtual translation, wherein DCAM, SCAM and zone group entries may be swapped between virtual hardware and real hardware. Once appropriate entries have been swapped in, frames will be re-transmitted and qualified by filtering again. The re-transmitted frames are processed by other filters with higher priority since there should be a SCAM, DCAM and zone group (either Subgroup A or Subgroup B) hit (e.g. the same frame should not be hit with this filter again). Should a real DCAM, SCAM or zone group miss occur, the frames should be discarded immediately without re-transmission.

A static filter can be provided for discarding all frames for which there is a zone group miss. This filter can be implemented on the Fx_Port, and prevents traffic that is not within the same zone from entering the zone. Preferably, this filter is enabled by default, thereby not requiring a conditional event to trigger the activation of the filter.

Another static filter can be provided for forwarding all frames through an E Port, unconditionally and preferably by default when zoning is enabled.

A further static filter can be provided at the Fx_Port to prevent write commands for Subgroup B. This filter enables Access Control and discards frames when there is a DCAM, SCAM and Subgroup B match, and when the R_CTL (with 0x06), FC_TYPE (with 0x08), FCP_CMD (with either 0x2A or 0x0A) fields indicate a write.

Also, a static filter can be provided at the Fx_Port to investigate the nature of the command received. Access Control is enabled when there is a DCAM, SCAM and Subgroup B match, and when the R_CTL (with 0x06), FC_TYPE (with 0x08) fields indicate any FCP Command except Read. For example, a Mode Sense command is considered to be a write command in nature and is discarded. By contrast, a Mode Select command is considered to be a read command in nature and is forwarded. This filter produces an action corresponding to List A.

E. Data Structures for Zoning Filters

Certain data structures are created for the management of the zoning filters. A filter status array can identify the status of each filter to signify whether it is enabled or disabled. Zoning filters are also shadowed in the system memory. In one embodiment, each filter is 32 bytes and there are 32 filters per port, requiring approximately 1 kilobyte of memory to shadow all the filters for a port. Filter shadowing is designed to speed up access to filter definition selection since the manipulation can be done in the kernel software and the write to the hardware can be done in at least 32-bit accesses, as opposed to hardware manipulation which may be implemented on a bit basis. Filter shadowing is also used to verify the filter definition selection integrity.

A variety of operations can be performed on the zoning filters. Filters are initialized, which typically disables the static filters and frees the dynamic filters. Dynamic filters may be allocated and freed as required. Additionally, both dynamic and static filters may be enabled and disabled. It will be evident to one of skill in the art that a variety of other operations may be performed upon the zoning filters during the management of frame filtering operations.

As discussed previously, DCAM, SCAM, zone group, field definition control and filter definition selection are critical and limited resources in the described embodiments. These frame filtering structures, both virtual and real, have a direct impact on the availability of zoning features. Occasionally, some of the information contained in these frame filtering structures becomes outdated. For example, devices attached to a switch may go offline. Invalid DCAM, SCAM and zone group entries may accumulate, eventually draining frame filtering resources and causing zoning to fail. Additionally, invalid entries may confuse the zoning logic. A similar situation may occur with the field definition control and filter definition selection resources used to implement dynamic filters. The exchange to be trapped may never show up, and these frame filtering resources are drained.

In one embodiment, in order to address these issues, an aging mechanism designed to invalidate entries and reclaim frame filtering resources is applied to some or all of the frame filtering resources. An aging counter is updated and checked periodically for SCAM, DCAM, and zone group resources. When a pre-selected aging count is reached, SCAM and DCAM entries are removed from both the real and virtual DCAM and SCAM. A DCAM entry removal may require SCAM entries and zone groups to be removed and/or reorganized. Likewise, a SCAM entry removal may require DCAM entries and zone groups to change. The aging counters are triggered by a port or device going offline and the counters can be incremented on a per second basis. The duration of the counters may be set to expire according to the Fibre Channel specific timeout values (e.g., 5 seconds for the firmware).

For field definition control and filter definition selection resources, aging is triggered by the installation of dynamic filters. Each dynamic filter has its own aging counter. When a pre-selected aging count is reached, the field definition control and filter definition selection resources are released for reuse. Aging counters are deactivated whenever a dynamic filter traps a frame.

Software and Hardware Initialization

The data structures described above are first initialized before they are used in frame filtering management. First, filtering kernel software is initialized at the quad level, before the hardware is ready to be initialized.

For example, the number of real SCAM, DCAM, and zone group entries is first determined. Virtual SCAM management is initialized, which in turn initializes the data structures used in virtual SCAM management. Virtual DCAM management is initialized, which in turn initializes the data structures used in virtual DCAM management. Since the management of virtual SCAM and virtual DCAM is similar, the same routine may be used to manage both data structures. The virtual zone group management is initialized, which will initialize the data structures used in virtual zone group management. Next, real SCAM management is initialized, and real DCAM management is initialized. This initializes the relative data structures for the real SCAM and DCAM. The same routine may also be used to manage both real SCAM and real DCAM data structures. Lastly, the real zone group management is initialized.

Once the frame filtering quad-based management structures have been initialized, the quad-based filtering hardware is initialized. The SCAM hardware is initialized, then the DCAM hardware is initialized, and then the zone group hardware is initialized. Next the port-based software and hardware structures are initialized. Data structures for filter definitions are initialized, and also for the field definitions. All other port-based hardware and software is then initialized.

Midware Programming of Firmware

Once the kernel software (at firmware 190) and hardware 195 used in frame filtering have been initialized, the midware 185 uses the zoning configurations input by the user (at interface 180) to program the firmware 190 for the requested frame filtering capabilities. The midware 185 issues various Input/Output control (IOCTL) calls to the firmware 190, several of which are described herein. It will be evident to one of ordinary skill in the art that many additional types of IOCTL calls are possible. The examples provided herein are purely for illustrative purposes.

A. Adding a Specified Zone Configuration to a Port

Figure 12:
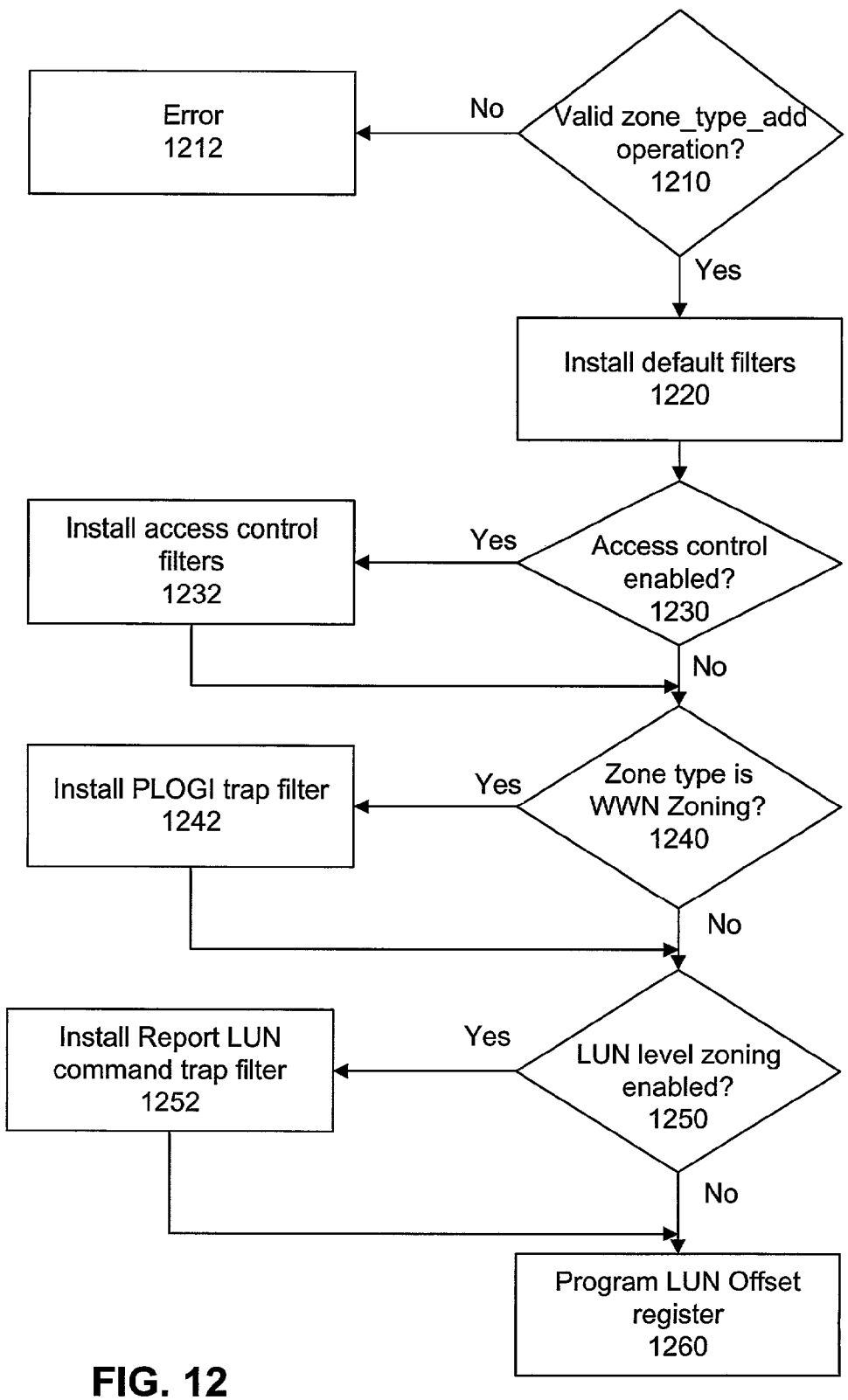
FIG. 12 is a flowchart illustrating one method for adding a specified zone configuration for a port in accordance with the present invention.

FIG. 12 illustrates one embodiment of a process by which a specified zone configuration is added to a port. In general, the operation to add a zone type can be used to enable WWN-level and port-level zoning, and also to enable LUN-level zoning, protocol-level zoning and access control level zoning, if desired. The midware 185 first checks to ensure that the operation to add the zone type is valid 1210. In response, the firmware 190 checks for conflicts between programmed zone configurations and also checks to see if zoning resources, such as filter definition blocks 540, are running out of capacity. A zoning conflict exists if the configuration's device nomenclature is inconsistent, such as if some but not all members of a zone are specified with device level zoning. Also, zones that do not accept FCP traffic cannot be created if any LUN-level zoning is specified. If a conflict exists or zoning resources are full, an error is returned 1212.

If the operation to add a zone type is valid, then default filters are installed 1220. For example, the default filters are the static filters that have been pre-assigned to the frame filtering system. These different types of default filters include port-level zoning and WWN-level zoning filters. Next, the firmware checks to see if access control has been enabled 1230. If access control has been enabled, the access control filters are installed 1232. The firmware 190 then continues to check if the zone type is WWN-level zoning 1240. If the zone type is WWN-level zoning, a trap PLOGI filter is installed 1242 in order to capture and be made aware of where the WWN device connects to the fabric.

The firmware 190 then continues to check if LUN-level zoning has been enabled 1250. If LUN-level zoning is enabled, a Report LUN trap filter is installed 1252 in order to capture and modify, if necessary, the Report LUN command. LUN-level zoning structures can be used to filter frames based on frame content other than a LUN value if the specified frame offset is set to point to something other than LUN number. When the frame offset is not set for LUN level zoning, a Report LUN command trap filter is not set up. The firmware 190 then proceeds to program the LUN offset register 1260. Typically, the LUN offset register includes up to four different offsets and masks to identify the LUN number, as well as the FC_TYPE that must be found before the LUN number field will be searched. The LUN offset register may be left blank if no LUN level zoning or other specified frame offset information is desired.

B. Adding a Destination ID to a Zone Group

Figure 13A:
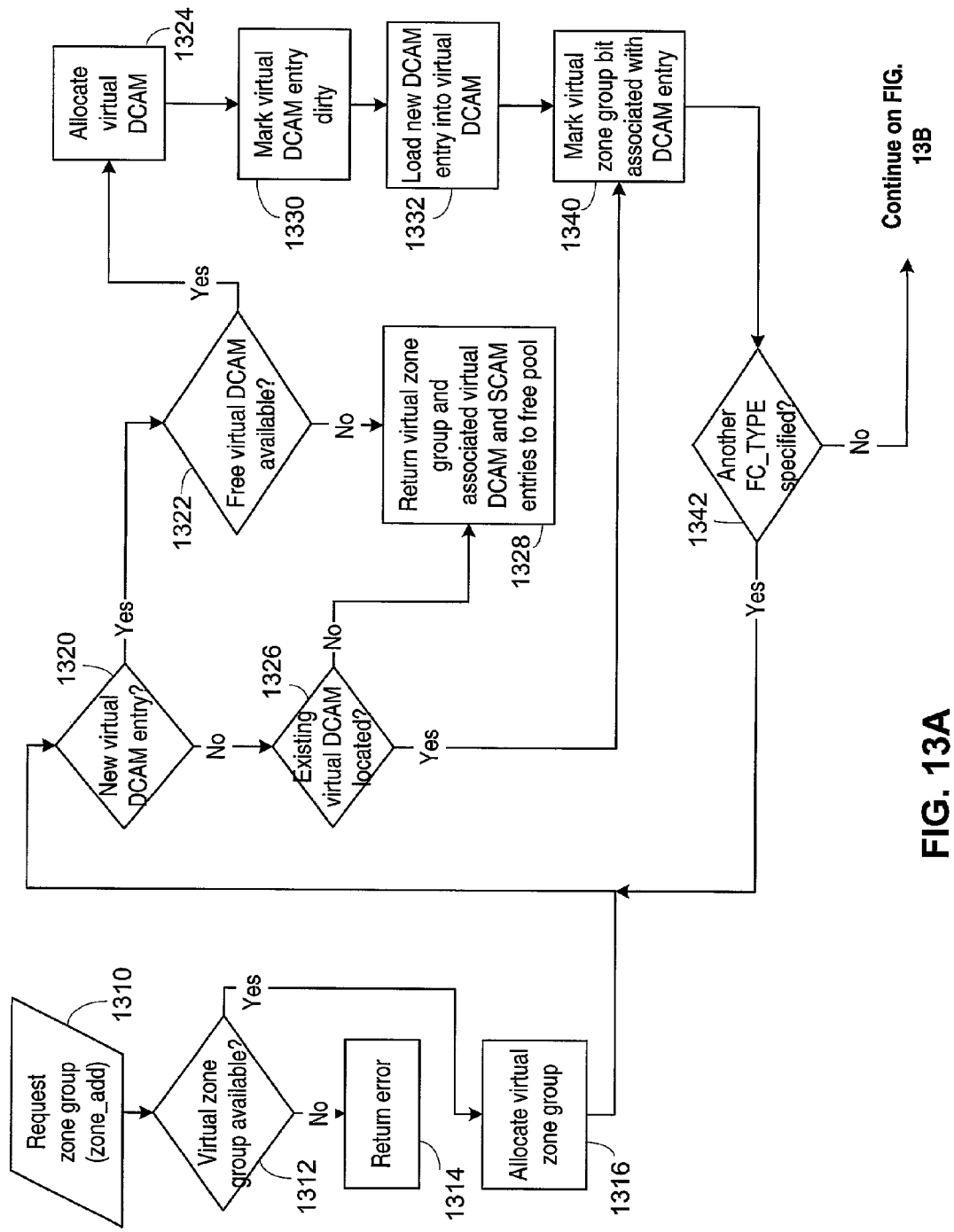
FIGS. 13A and 13B are flowcharts of a procedure for adding a single D_ID-based zone group in an embodiment of the present invention.
Figure 13B:
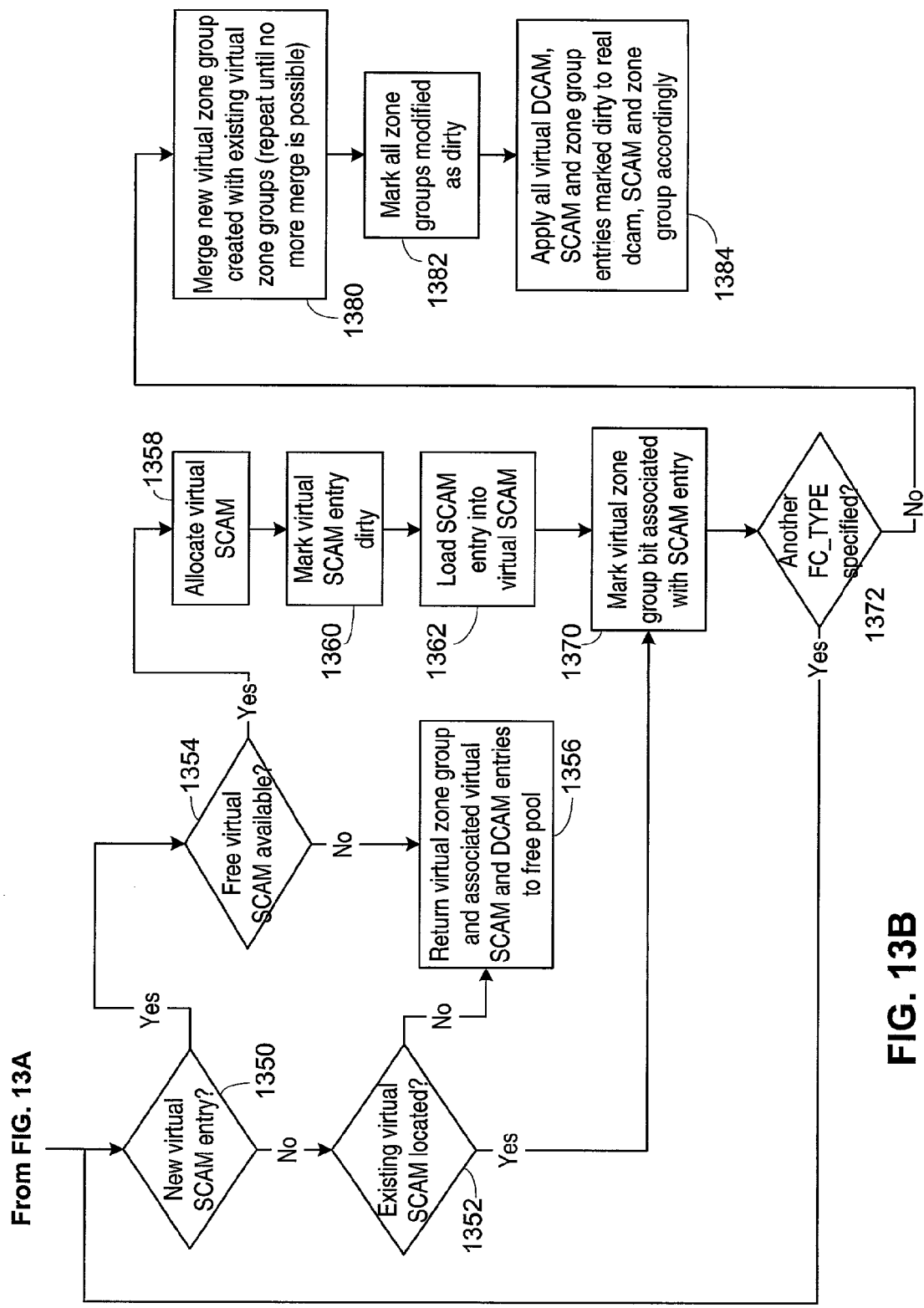

FIGS. 13A and 13B illustrate the process by which a D_ID with up to 64 S_IDs is grouped into one zone group. There may be up to 4 FC_TYPE values, and up to 4 offsets within the first 64 bytes of the frame header, usually the LUN number offsets, are included as part of the zone group specification. This operation to add a zone effectively adds a single D_ID based zone group to a port. At step 1310, a request is received to add a zone. In response thereto, the firmware 190 checks to see if there is available virtual zone group resources 1312. If there is no more virtual zone group space available, the firmware 190 returns an error 1314. If resources are available, a virtual zone group entry is allocated from the virtual zone group free pool 1316.

The firmware 190 then determines 1320 whether the requested zone group adds a new virtual DCAM entry or if the virtual DCAM entry already exists. If the virtual DCAM entry already exists, the firmware 190 checks 1326 that the virtual DCAM entry has been located. If the virtual DCAM entry cannot be located, the virtual zone group and associated DCAM and SCAM entries are returned to their free pools 1328. If a new DCAM entry is to be added, the firmware 190 determines 1322 whether there is free virtual DCAM available. If no free virtual DCAM is available, the new virtual zone group and all associated virtual DCAM entries are returned to their free pools 1328, and the request fails and returns an error. If a free virtual DCAM is available, a virtual DCAM entry is allocated from the virtual DCAM free pool 1324. The new virtual DCAM entry is marked "dirty" 1330, and the new DCAM entry is loaded into the virtual DCAM 1332.

After the existing DCAM entry is located 1326 or the new DCAM entry has been loaded 1332, the zone group bit associated with the DCAM entry is marked 1340. The firmware 190 then determines 1342 whether an additional FC_TYPE has been specified with the requested zone group. If an additional FC_TYPE has been specified, the operation returns to step 1320 to check if the next additional DCAM entry is new. If an additional FC_TYPE has not been specified, the firmware 190 checks 1350 to determine if the requested zone group adds a new virtual SCAM entry or if the virtual SCAM entry already exists. If the virtual SCAM entry already exists, the firmware 190 checks 1352 that the virtual SCAM entry has been located. If the virtual SCAM entry cannot be located, the virtual zone group and associated SCAM and DCAM entries are returned to their free pools 1328.

If a new SCAM entry is to be added, the firmware 190 determines whether there is free virtual SCAM available 1354. If no free virtual SCAM is available, the new virtual zone group and all associated virtual SCAM and DCAM entries are returned to their free pools 1328, and the request fails with an error being returned. If a free virtual SCAM is available, a virtual SCAM entry is allocated from the virtual SCAM free pool 1356. The new virtual SCAM entry is marked "dirty" 1360, and the new SCAM entry is loaded into the virtual SCAM 1362.

After the existing SCAM entry is located 1352 or the new SCAM entry has been loaded 1362, the zone group bit associated with the SCAM entry is marked 1370. The firmware 190 then checks 1372 to see if an additional FC_TYPE has been specified with the requested zone group. If an additional FC_TYPE has been specified, the operation returns to step 1350 to check if the next additional SCAM entry is new. After all FC_TYPEs have been incorporated, the new virtual zone group is merged 1380 with existing virtual zone groups. Merging is repeated until no more merging is possible. All zone groups that have been modified are marked as dirty 1382. All virtual SCAM, DCAM and zone group entries marked dirty are applied to the real SCAM, DCAM and zone groups accordingly.

Once the operation to add a zone type has set up the frame filters for a particular zone type at a port, and a series of operations for adding a zone have installed a series of D_ID based zone groups to a specified port, the operation for enabling a zone is used to enable the zoning configuration in the hardware 195. By doing so, all frame traffic through the port will be subject to frame filtering.

C. Enabling Zoning For a Specified Port

Figure 14:
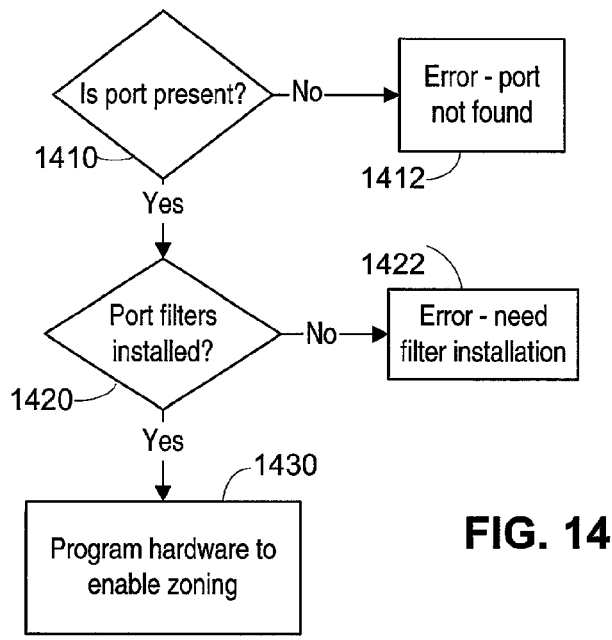
FIG. 14 is a flowchart illustrating one method for enabling zoning for a specified port in accordance with the present invention.

FIG. 14 illustrates the process by which zoning is enabled in a port of a switch. The purpose of this operation is to enable zoning for all ports of a switch except those ports that have been excluded.

The firmware 190 checks to ensure that the port of interest is present 1410. If the port is not present, an error is returned 1412. Next the firmware 190 checks to ensure that the port filters have been installed 1420. If the port filters have not yet been installed, an error is returned 1422. The firmware then proceeds to program the hardware with the installed port filters 1430. It will be understood by one of skill in the art that the process to enable zoning may proceed port-by-port through the ports of the switch, or may be performed substantially in parallel through the ports of the switch.

D. Resetting Zone Configuration for a Port

Figure 15:
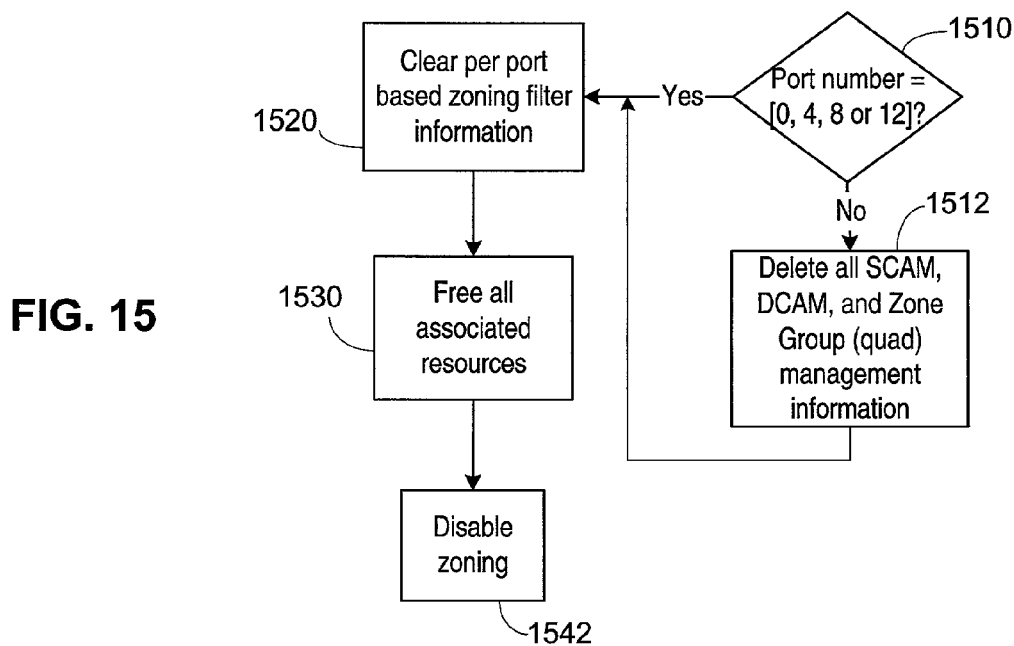
FIG. 15 is a flowchart illustrating one method for resetting the zone configurations for a specified port in accordance with the present invention.

FIG. 15 illustrates the process by which zoning is removed in a port of a switch. This operation to reset a zone will wipe out both zone type and all zone groups configured for all ports of the switch. The operation can be invoked over any port of a particular switch and all ports of the switch will be affected. Whenever there is a zoning change, this operation is used to clear all zone configurations so that the zoning software can start building a new zoning configuration.

As shown in FIG. 15, the firmware 190 checks the port number for the port currently of interest 1510. For example, if the port number is 0, 4, 8, 12, then all of the quad-based SCAM, DCAM and zone group management is deleted 1512. The quad-based management features only need to be deleted once per each set of four ports, which is accomplished by only deleting them for every fourth port. Next, the per-port based zoning information is cleared 1520. All associated resources are freed 1530. Then zoning is disabled 1542. It will be understood by one of skill in the art that the process to reset the zone may proceed port-by-port through the ports of the switch, or may be performed substantially in parallel through the ports of the switch.

List Processing

Certain types of frame filters designate either "List A" or "List B" as the action to take if their frame filter criteria are satisfied. In one embodiment, List A is dedicated for dynamic filters, and List B is dedicated for static filters. List processing is typically carried out by the firmware 190 residing on the CPU of the switch.

Figure 16:
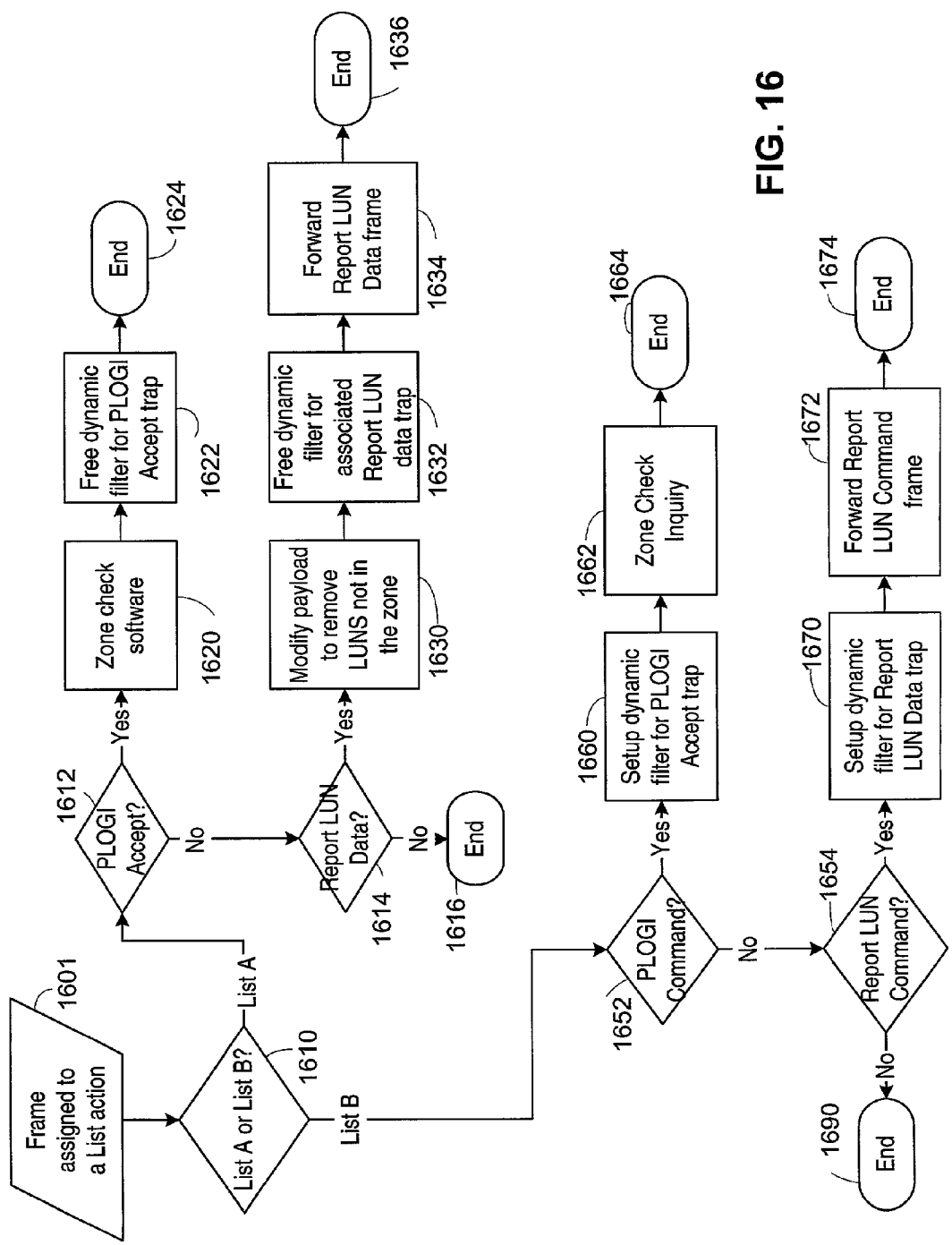
FIG. 16 is a flowchart illustrating one method for creating and deleting dynamic filters based upon a list assignment action in accordance with the present invention.

Referring to FIG. 16, list processing begins when a frame filtering action prioritization process returns a "list" action 1601. The frame being filtered is then placed into either List A or List B for processing 1610. If the received frame is in List A, the process checks if the frame is a PLOGI Accept frame 1612. A PLOGI Accept frame is used by devices to log into the fabric, and provides information about where particular WWN devices are actually connected. A zone check request is issued 1620 to the midware 185 upon the information contained in the PLOGI Accept frame to check for potential zone conflicts caused by the new device. The dynamic filter set up to trap the particular PLOGI Accept frame is then freed 1622, and the process ends 1624.

If the frame is not a PLOGI Accept frame, the process checks if the frame is a Report LUN Data/Response frame 1614. A Report LUN Data/Response frame informs devices of which LUNs are available for communication. The Report LUN Data/Response frame payload is modified 1630 by the CPU, in order to remove LUNs not in the zone of the destination device. In this way, the destination device will not learn about the existence of LUNs outside of its particular zone. The dynamic filter set up to trap the particular Report LUN Data/Response frame is then freed 1632, the modified Report LUN Data/Response frame is forwarded 1634, and the process ends 1636.

In one embodiment, if the frame in List A is not a PLOGI Accept or a Report LUN Data/Response frame, the processing ends 1616. It will be evident to one of skill in the art that additional actionable types of frames may be added to List A.

If the received frame is in List B, the process checks to determine if the frame is a PLOGI frame 1652. Based upon the PLOGI frame, a dynamic filter is set up 1660 to trap the associated PLOGI Accept frame, and the zone check is issued 1662 to the midware to ensure that the PLOGI is performed between the devices that are within the same WWW zone. The process then ends at 1664.

If the frame is not a PLOGI Command frame, the process checks if the frame is a Report LUN Command frame 1654 (i.e., which is an FCP command frame with CSI cdb 0 being 0xA0). Based upon the Report LUN Command frame, a dynamic filter is set up 1670 to trap the associated Report LUN Data/Response frame, and the Report LUN Command frame is forwarded 1672. The process then ends 1674.

In one embodiment, if the frame in List B is not a PLOGI Command or a Report LUN Command frame, the processing ends 1690. It will be evident to one of skill in the art that additional actionable types of frames may be added to List B.

Thus has been described a method and apparatus according to the present invention to do both frame filtering and hardware zoning at full wire speed. Frame filtering can be very flexible and hardware zoning can be done on many different conditions, greatly improving the security of the fabric while maintaining performance levels. Additionally, flexibility has been shown by the ability to virtualize the limited hardware, to allow even more selection by the administrator with only a small loss in system performance.

Although the invention has been described in considerable detail with reference to certain embodiments, other embodiments are possible. As will be understood by those of skill in the art, the invention may be embodied in other specific forms without departing from the essential characteristics thereof. For example, different numbers of ports (other than the four ports illustrated herein) may be supported by the zone group based filtering logic. Additionally, the hardware structures within the switch may be modified to allow additional frame payload bytes to be read and used for frame filtering. Accordingly, the present invention is intended to embrace all such alternatives, modifications and variations as fall within the spirit and scope of the appended claims and equivalents.

What is claimed is:

1. A Fibre Channel device for use in a Fibre Channel fabric, the fabric coupling a plurality of external devices, the fabric configured into at least two zones, where the external devices are allowed to exchange data packets only with external devices in the same zone, the Fibre Channel device enforcing the zones in hardware, the Fibre Channel device comprising:
   a receiving port for coupling to the fabric and receiving data packets;
   a transmitting port for coupling to the fabric and transmitting data packets; and
   device logic connecting said receiving port and said transmitting port, wherein said device logic includes:
      zoning data storage for storing configuration data indicative of the zone configuration of the fabric, including logical unit numbers (LUNs) of the external devices allowed to exchange data packets;
      a comparison circuit connected to said zoning data storage for comparing the LUN field of a received data packet with said stored configuration data and providing an output; and
      an action circuit connected to said LUN field comparison circuit and utilizing said LUN field comparison circuit output to determine an action to be performed on the received data packet.

2. The Fibre Channel device of claim 1, wherein the action determined by said action circuit is to forward the data packet, and wherein said transmitting port transmits the data packet.

3. The Fibre Channel device of claim 1, wherein the action determined by said action circuit is to discard the data packet, and wherein said transmitting port does not transmit the data packet.

4. The Fibre Channel device of claim 1, wherein said device logic further includes:
   a central memory for storing data packets;
   receiver logic connected to said receiving port and said central memory for receiving a data packet from said receiving port and storing the data packet in said central memory; and
   transmitter logic connected to said transmitting port and said central memory for retrieving the data packet from said central memory and providing the data packet to said transmitting port,
   wherein said zoning data storage, LUN field comparison circuit and said action circuit are included in said transmitter logic.

5. The Fibre Channel device of claim 1, wherein the external devices are fabric-attached, loop-attached or a combination of fabric-attached and loop-attached.

6. The Fibre Channel device of claim 1, wherein the external devices are fabric-attached.

7. The Fibre Channel device of claim 1, wherein said device logic further includes:
   a comparison circuit connected to said zoning data storage and said action circuit for comparing the Fibre Channel type of a received data packet with said stored configuration data and providing an output; and
   wherein said action circuit further utilizes said Fibre Channel type comparison circuit output to determine said action to be performed.

8. The Fibre Channel device of claim 7,
   wherein said zoning data storage further includes:
      addresses of the external devices allowed to exchange data packets;
      wherein said device logic further includes:
         a comparison circuit connected to said zoning data storage for comparing the source address of a received data packet with said stored configuration data and providing an output; and
         a comparison circuit connected to said zoning data storage for comparing the destination address of a received data packet with said stored configuration data and providing an output; and
      wherein said action circuit further utilizes said source address and destination address comparison circuit outputs to determine said action to be performed.

9. The Fibre Channel device of claim 8,
   wherein said zoning data storage further includes an offset value defining an amount of offset into a data packet to indicate the location of the LUN field in the data packet, and
   wherein said LUN field comparison circuit utilizes said offset value to determine the LUN field of the received data packet.

10. The Fibre Channel device of claim 7,
    wherein said zoning data storage further includes an offset value defining an amount of offset into a data packet to indicate the location of the LUN field in the data packet, and
    wherein said LUN field comparison circuit utilizes said offset value to determine the LUN field of the received data packet.

11. The Fibre Channel device of claim 1,
    wherein said zoning data storage further includes an offset value defining an amount of offset into a data packet to indicate the location of the LUN field in the data packet, and
    wherein said LUN field comparison circuit utilizes said offset value to determine the LUN field of the received data packet.

12. A Fibre Channel switch for use in a Fibre Channel fabric, the fabric coupling a plurality of external devices, the fabric configured into at least two zones, where the external devices are allowed to exchange data packets only with external devices in the same zone, the Fibre Channel switch enforcing the zones in hardware, the Fibre Channel switch comprising:
    a microprocessor;
    local memory connected to said microprocessor; and
    a Fibre Channel device connected to and controlled by said microprocessor, wherein said Fibre Channel device includes:
       a receiving port for coupling to the fabric and receiving data packets;
       a transmitting port for coupling to the fabric and transmitting data packets; and
       device logic connecting said receiving port and said transmitting port, wherein said device logic includes:
          zoning data storage for storing configuration data indicative of the zone configuration of the fabric, including logical unit numbers (LUNs) of the external devices allowed to exchange data packets;
          a comparison circuit connected to said zoning data storage for comparing the LUN field of a received data packet with said stored configuration data and providing an output; and
          an action circuit connected to said LUN field comparison circuits and utilizing said LUN field circuit output to determine an action to be performed on the received data packet.

13. The Fibre Channel switch of claim 12, wherein the action determined by said action circuit is to forward the data packet, and wherein said transmitting port transmits the data packet.

14. The Fibre Channel switch of claim 12, wherein the action determined by said action circuit is to discard the data packet, and wherein said transmitting port does not transmit the data packet.

15. The Fibre Channel switch of claim 12, wherein said device logic further includes:
    a central memory for storing data packets;
    receiver logic connected to said receiving port and said central memory for receiving a data packet from said receiving port and storing the data packet in said central memory; and
    transmitter logic connected to said transmitting port and said central memory for retrieving the data packet from said central memory and providing the data packet to said transmitting port,
    wherein said zoning data storage, LUN field comparison circuit and said action circuit are included in said transmitter logic.

16. The Fibre Channel switch of claim 12, wherein the external devices are fabric-attached, loop-attached or a combination of fabric-attached and loop-attached.

17. The Fibre Channel switch of claim 12, wherein the external devices are fabric-attached.

18. The Fibre Channel switch of claim 12, wherein said device logic further includes:
    a comparison circuit connected to said zoning data storage and said action circuit for comparing the Fibre Channel type of a received data packet with said stored configuration data and providing an output; and
    wherein said action circuit further utilizes said Fibre Channel type comparison circuit output to determine said action to be performed.

19. The Fibre Channel switch of claim 18,
    wherein said zoning data storage further includes:
       addresses of the external devices allowed to exchange data packets;
       wherein said device logic further includes:
          a comparison circuit connected to said zoning data storage for comparing the source address of a received data packet with said stored configuration data and providing an output; and
          a comparison circuit connected to said zoning data storage for comparing the destination address of a received data packet with said stored configuration data and providing an output; and
       wherein said action circuit further utilizes said source address and destination address comparison circuit outputs to determine said action to be performed.

20. The Fibre Channel switch of claim 19,
wherein said zoning data storage further includes an offset value defining an amount of offset into a data packet to indicate the location of the LUN field in the data packet, and
wherein said LUN field comparison circuit utilizes said offset value to determine the LUN field of the received data packet.

21. The Fibre Channel switch of claim 18,
wherein said zoning data storage further includes an offset value defining an amount of offset into a data packet to indicate the location of the LUN field in the data packet, and
wherein said LUN field comparison circuit utilizes said offset value to determine the LUN field of the received data packet.

22. The Fibre Channel switch of claim 12,
wherein said zoning data storage further includes an offset value defining an amount of offset into a data packet to indicate the location of the LUN field in the data packet, and
wherein said LUN field comparison circuit utilizes said offset value to determine the LUN field of the received data packet.

23. A Fibre Channel fabric comprising:
a plurality of external devices;
a first Fibre Channel switch coupled to a first portion of said plurality of external devices; and
a second Fibre Channel switch coupled to a second portion of said plurality of external devices and coupled to said first Fibre Channel switch,
wherein the fabric is configured into at least two zones, where said external devices are allowed to exchange data packets only with external devices in the same zone and wherein said first and second Fibre Channel switches enforce the zones in hardware, each of said first and second Fibre Channel switches including:
a microprocessor;
local memory connected to said microprocessor; and
a Fibre Channel device connected to and controlled by said microprocessor, wherein said Fibre Channel device includes:
a receiving port for coupling to the fabric and receiving data packets;
a transmitting port for coupling to the fabric and transmitting data packets; and
device logic connecting said receiving port and said transmitting port, wherein said device logic includes:
zoning data storage for storing configuration data indicative of the zone configuration of the fabric, including logical unit numbers (LUNs) of the external devices allowed to exchange data packets;
a comparison circuit connected to said zoning data storage for comparing the LUN field of a received data packet with said stored configuration data and providing an output; and
an action circuit connected to said LUN field comparison circuit and utilizing said LUN field comparison circuit output to determine an action to be performed on the received data packet.

24. The Fibre Channel fabric of claim 23, wherein the action determined by said action circuit is to forward the data packet, and wherein said transmitting port transmits the data packet.

25. The Fibre Channel fabric of claim 23, wherein the action determined by said action circuit is to discard the data packet, and wherein said transmitting port does not transmit the data packet.

26. The Fibre Channel fabric of claim 23, wherein said device logic further includes:
a central memory for storing data packets;
receiver logic connected to said receiving port and said central memory for receiving a data packet from said receiving port and storing the data packet in said central memory; and
transmitter logic connected to said transmitting port and said central memory for retrieving the data packet from said central memory and providing the data packet to said transmitting port,
wherein said zoning data storage, LUN field comparison circuit and said action circuit are included in said transmitter logic.

27. The Fibre Channel fabric of claim 23, wherein said external devices are fabric-attached, loop-attached or a combination of fabric-attached and loop-attached.

28. The Fibre Channel fabric of claim 23, wherein said external devices are fabric-attached.

29. The Fibre Channel fabric of claim 23, wherein said device logic further includes:
a comparison circuit connected to said zoning data storage and said action circuit for comparing the Fibre Channel type of a received data packet with said stored configuration data and providing an output; and
wherein said action circuit further utilizes said Fibre Channel type comparison circuit output to determine said action to be performed.

30. The Fibre Channel device of claim 29,
wherein said zoning data storage further includes:
addresses of the external devices allowed to exchange data packets;
wherein said device logic further includes:
a comparison circuit connected to said zoning data storage for comparing the source address of a received data packet with said stored configuration data and providing an output; and
a comparison circuit connected to said zoning data storage for comparing the destination address of a received data packet with said stored configuration data and providing an output; and
wherein said action circuit further utilizes said source address and destination address comparison circuit outputs to determine said action to be performed.

31. The Fibre Channel device of claim 30,
wherein said zoning data storage further includes an offset value defining an amount of offset into a data packet to indicate the location of the LUN field in the data packet, and
wherein said LUN field comparison circuit utilizes said offset value to determine the LUN field of the received data packet.

32. The Fibre Channel device of claim 29,
wherein said zoning data storage further includes an offset value defining an amount of offset into a data packet to indicate the location of the LUN field in the data packet, and
wherein said LUN field comparison circuit utilizes said offset value to determine the LUN field of the received data packet.

33. The Fibre Channel device of claim 23,
wherein said zoning data storage further includes an offset value defining an amount of offset into a data packet to indicate the location of the LUN field in the data packet, and
wherein said LUN field comparison circuit utilizes said offset value to determine the LUN field of the received data packet.

* * * * *